(12) United States Patent
Hattori et al.

(10) Patent No.: US 10,538,043 B2
(45) Date of Patent: *Jan. 21, 2020

(54) V-BELT MANUFACTURING METHOD

(71) Applicant: BANDO CHEMICAL INDUSTRIES, LTD., Kobe-shi, Hyogo (JP)

(72) Inventors: Yohei Hattori, Kobe (JP); Tomoaki Hata, Kobe (JP); Hirokazu Sakurai, Kobe (JP); Takashi Matsuoka, Kobe (JP); Hideaki Kawahara, Kobe (JP); Hisashi Izumi, Kobe (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,735

(22) Filed: Sep. 21, 2018

(65) Prior Publication Data

US 2019/0022964 A1 Jan. 24, 2019

Related U.S. Application Data

(63) Continuation of application No. PCT/JP2017/007284, filed on Feb. 27, 2017.

(30) Foreign Application Priority Data

Mar. 23, 2016 (JP) .................. 2016-059163

(51) Int. Cl.
*B29D 29/10* (2006.01)
*F16G 5/20* (2006.01)
(Continued)

(52) U.S. Cl.
CPC ............ *B29D 29/103* (2013.01); *B29C 35/02* (2013.01); *B29D 29/10* (2013.01); *F16G 5/08* (2013.01); *F16G 5/20* (2013.01); *B29C 37/0053* (2013.01)

(58) Field of Classification Search
CPC ...... B29D 29/10; B29D 29/103; B29D 29/08; F16G 5/06; F16G 5/08; B29C 47/0042
(Continued)

(56) References Cited

U.S. PATENT DOCUMENTS 4,359,355 A * 11/1982 Stecklein ............ B29D 29/106
156/138
5,807,194 A * 9/1998 Knutson ............... B29D 29/08
474/268

(Continued)

FOREIGN PATENT DOCUMENTS

JP 2004-174772 A 6/2004
JP 2010-125725 A 6/2010
JP 2011-031407 A 2/2011

*Primary Examiner* — Matthew J Daniels
*Assistant Examiner* — Yunju Kim
(74) *Attorney, Agent, or Firm* — Maschoff Brennan

(57) ABSTRACT

A production method of a V-belt uses a belt mold having a plurality of compression layer-shape grooves arranged adjacent to one another in a groove width direction. A shaped structure having a plurality of ridges on an outer peripheral surface is crosslinked and combined with a fabric material to form a belt slab, while the compression layer-forming portions, which are the ridges covered with the fabric material, being fitted in the respective compression layer-shape grooves of the belt mold. The belt slab is cut into ring-shaped pieces such that one ring-shaped piece corresponds to one compression layer-forming portion.

21 Claims, 30 Drawing Sheets

(51) Int. Cl.
*F16G 5/08* (2006.01)
*B29C 35/02* (2006.01)
*B29C 37/00* (2006.01)

(58) Field of Classification Search
USPC .................. 156/138; 264/241, 49; 29/33 S
See application file for complete search history.

(56) References Cited

U.S. PATENT DOCUMENTS

| | | | | |
|---|---|---|---|---|
| 7,305,744 | B2* | 12/2007 | Hara | B29D 29/08 |
| | | | | 29/33 S |
| 2003/0017900 | A1* | 1/2003 | Kopang | B29D 29/00 |
| | | | | 474/260 |
| 2003/0073533 | A1* | 4/2003 | Knutson | B29D 29/08 |
| | | | | 474/263 |
| 2009/0291796 | A1* | 11/2009 | Mitsutomi | B29D 29/103 |
| | | | | 474/252 |
| 2011/0028257 | A1* | 2/2011 | Sealey | C08K 3/04 |
| | | | | 474/263 |
| 2014/0103562 | A1* | 4/2014 | Okubo | B29D 29/103 |
| | | | | 264/49 |
| 2014/0296011 | A1* | 10/2014 | Yoshida | F16G 5/08 |
| | | | | 474/261 |
| 2019/0084191 | A1* | 3/2019 | Scholzen | B29C 70/541 |

* cited by examiner

V-BELT MANUFACTURING METHOD

CROSS-REFERENCE TO RELATED APPLICATIONS

This is a continuation of International Application No. PCT/JP2017/007284 filed on Feb. 27, 2017, which claims priority to Japanese Patent Application No. 2016-059163 filed on Mar. 23, 2016. The entire disclosures of these applications are incorporated by reference herein.

BACKGROUND

The present invention relates to a method for producing a V-belt.

A so-called wrapped V-belt is comprised of a belt body made of rubber and having a trapezoidal cross section with a cord buried therein, and canvas which covers the entire circumference of the belt body. Such a wrapped V-belt is produced on a one-on-one basis by covering, and shaping, the uncrosslinked belt body with the canvas, and crosslinking the thus obtained product (see, e.g., Japanese Unexamined Patent Publication No. 2011-031407 and Japanese Unexamined Patent Publication No. 2010-125725).

SUMMARY

The present invention is directed to a production method of a V-belt having a compression layer which forms an inner peripheral side, in a thickness direction, of the V-belt, and which has, on both sides thereof, friction transmission surfaces covered with a covering fabric. The method includes: using a belt mold having a plurality of compression layer-shape grooves arranged adjacent to one another in a groove width direction; heating and pressing, toward the belt mold, and thereby crosslinking a shaped structure having a cylindrical shape and integrating the shaped structure and a fabric material to form a cylindrical belt slab, the shaped structure being made of an uncrosslinked rubber composition and having, on an outer peripheral surface thereof, a plurality of ridges each extending in a circumferential direction and arranged adjacent to one another in an axial direction, while having each of compression layer-forming portions, which are to be the compression layer, fitted in an associated one of the compression layer-shape grooves of the belt mold, each of the compression layer-forming portions being comprised of an associated one of the plurality of ridges of the shaped structure which is covered with the fabric material to be the covering fabric; and cutting the belt slab into ring-shaped pieces such that one ring-shaped piece corresponds to one compression layer-forming portion.

DETAILED DESCRIPTION

Embodiments will be described in detail below with reference to the drawings.

Figure 1:
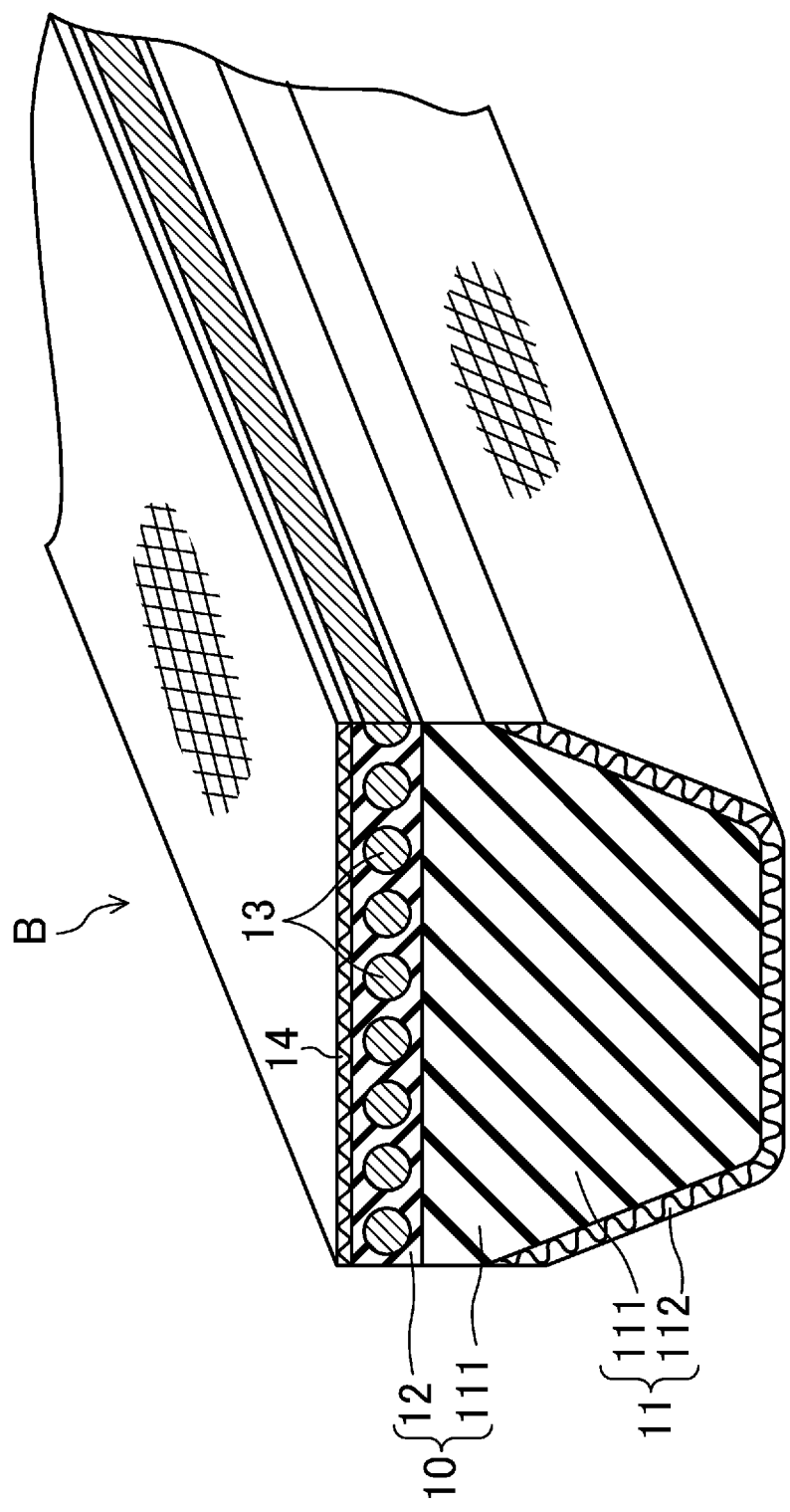
FIG. 1 is a perspective view of a V-belt produced by a production method according to an embodiment.

FIG. 1 shows a V-belt B produced by production methods according to an embodiment. The V-belt B is usable as a power transmission member for various machines. For example, the V-belt B has a length of 500 mm to 3000 mm, a width of 7.5 mm to 32 mm, and a thickness of 5.5 mm to 20 mm.

The V-belt B of the present embodiment is comprised of a rubber-made belt body 10 including a core rubber layer 111 which forms an inner peripheral side, in the thickness direction, of the belt B and an adhesive rubber layer 12 which forms an outer peripheral side, in the thickness direction, of the belt B. The core rubber layer 111 has a surface covered with a covering fabric 112. The core rubber layer 111 and the covering fabric 112 form a compression layer 11 which constitutes the inner peripheral side of the belt B in the thickness direction. A cord 13 is embedded in a middle portion, in the thickness direction, of the adhesive rubber layer 12. The cord 13 forms, in the adhesive rubber layer 12, a helical pattern having pitches in the width direction. A reinforcing fabric 14 is attached to the outer side of the adhesive rubber layer 12, i.e., the back face of the belt. The V-belt B is configured such that the reinforcing fabric 14, the adhesive rubber layer 12, and an upper portion of the compression layer 11, which together constitute an outer side portion of the belt B, have the same width. This means that the side surfaces of that portion are perpendicular to the back face of the belt. The other portion of the belt B which constitutes an inner side portion of the belt B, i.e., a lower portion of the compression layer 11, is configured to have a smaller width toward the inner side. This means that the side surfaces, in the width direction, of that portion are inclined surfaces which are angled inward with respect to the back face of the belt toward the inner side. The inclined surfaces on both sides of the compression layer 11 constitute a friction transmission surface covered with the covering fabric 112. Note that the V-belt B may include a stretch rubber layer instead of the reinforcing fabric 14. Thus, the rubber-made belt body may include the core rubber layer, the adhesive rubber layer, and the stretch rubber layer.

The core rubber layer 111 and the adhesive rubber layer 12 are each made of a crosslinked rubber composition which is produced through heating and pressing of an uncrosslinked rubber composition prepared by kneading a blend of a rubber component and various compound ingredients. The core rubber layer 111 and the adhesive rubber layer 12 may be made of the same rubber composition.

Examples of the rubber component include ethylene-α-olefin elastomer (such as EPDM and EPR), chloroprene rubber (CR), chlorosulfonated polyethylene rubber (CSM), and hydrogenated acrylonitrile-butadiene rubber (H-NBR). One kind or a blend of two or more kinds of these substances is suitable as the rubber component. Examples of the compound ingredients include a reinforcing material (such as carbon black), a filler, a plasticizer, a processing aid, a crosslinking agent, a co-crosslinking agent, a vulcanization accelerator, a vulcanization accelerator aid, and an antioxidant.

The covering fabric 112 is comprised of a woven, knitted, or unwoven fabric made of nylon fibers, polyester fibers, aramid fibers, or cotton, for example. In a preferred embodiment, the covering fabric 112 is highly stretchable. An adhesion treatment may be provided to the covering fabric 112 to make the covering fabric 112 adhesive to the core rubber layer 111 of the belt body 10.

The cord 13 is made of a twisted yarn of fibers, such as polyester fibers, polyethylene naphthalate fibers, aramid fibers, and vinylon fibers. The cord 13 has undergone an adhesion treatment to be adhesive to the adhesive rubber layer 12 of the belt body 10.

The reinforcing fabric 14 is comprised of a woven, knitted, or unwoven fabric made of nylon fibers, polyester fibers, aramid fibers, or cotton, for example. The reinforcing fabric 14 has undergone an adhesion treatment to be adhesive to the adhesive rubber layer 12 of the belt body 10.

(First Production Method)

A first production method of the V-belt B according to the embodiment will be described with reference to FIGS. 2 to 9.

The first production method includes a component preparation step, a shaping step, a crosslinking step, and a finishing step.

<Component Preparation Step>

In the component preparation step, a core rubber sheet 111' which is to constitute a core rubber layer 111, a fabric material 112' which is to constitute a covering fabric lib, an adhesive rubber sheet 12' which is to constitute an adhesive rubber layer 12, a cord 13', and a reinforcing fabric 14' are prepared.

Core Rubber Sheet 111'

A rubber component and compound ingredients are kneaded together by using a kneading machine such as a kneader or a Banbury mixer to obtain an uncrosslinked rubber composition. The uncrosslinked rubber composition is formed into a thick uncrosslinked rubber sheet 111" by calendar molding, etc. The core rubber sheet 111' is then prepared from the uncrosslinked rubber sheet 111".

Figure 2:
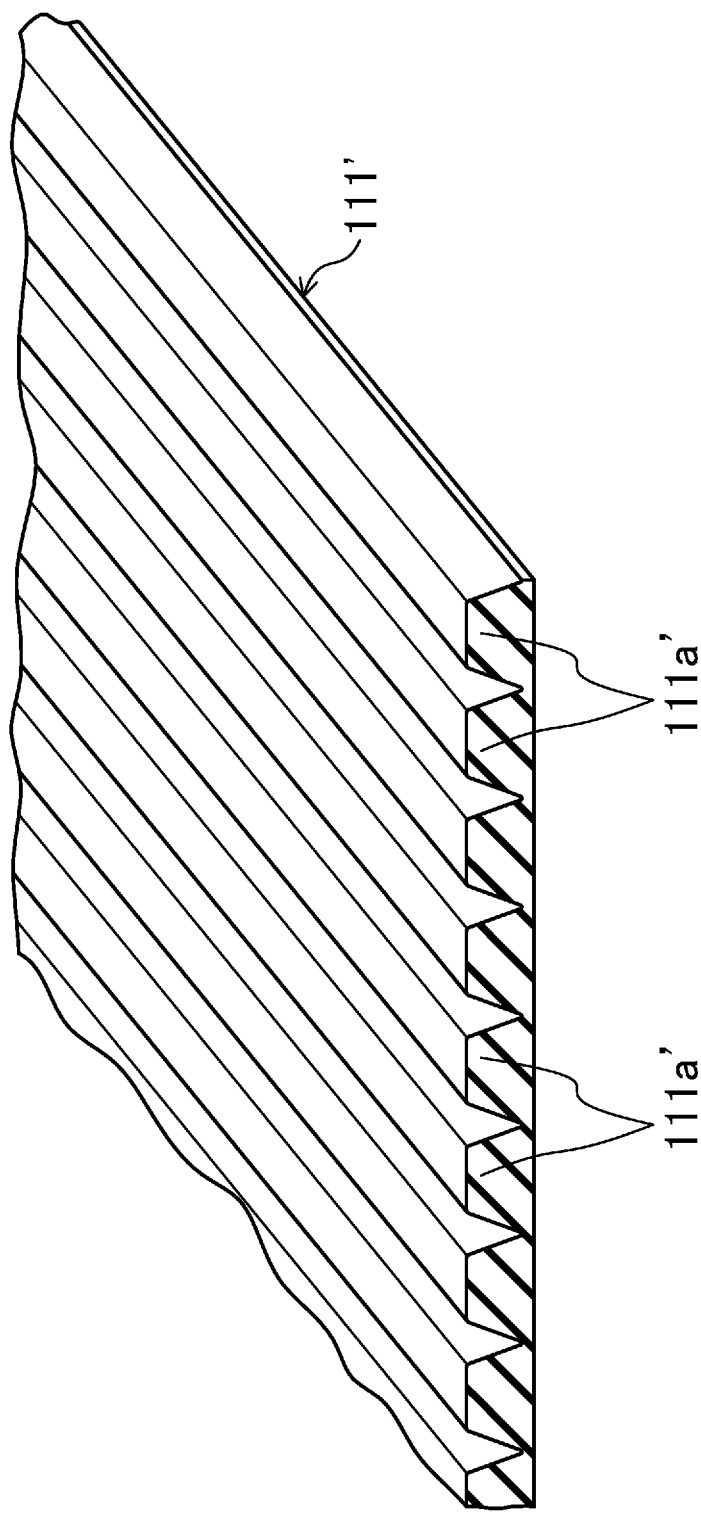
FIG. 2 is a perspective view of a core rubber sheet for use in a first production method.

FIG. 2 shows the core rubber sheet 111'.

The core rubber sheet 111' has, on one surface, core rubber layer-forming portions 111a' which are linearly-extending ridges and which extend parallel to one another. The core rubber sheet 111' is formed into a shape which looks like a collection of a plurality of core rubber layers 111 each forming part of a V-belt B to be produced, wherein the core rubber layers 111 are arranged side by side and connected together such that adjacent core rubber layers 111 are coupled to each other at the sides. Thus, the core rubber layer-forming portions 111a' have the same shape. Each core rubber layer-forming portion 111a' has a width decreasing toward its distal end. Specifically, each core rubber layer-forming portion 111a' is shaped to have a cross section in an isosceles trapezoidal shape.

Figure 3A:
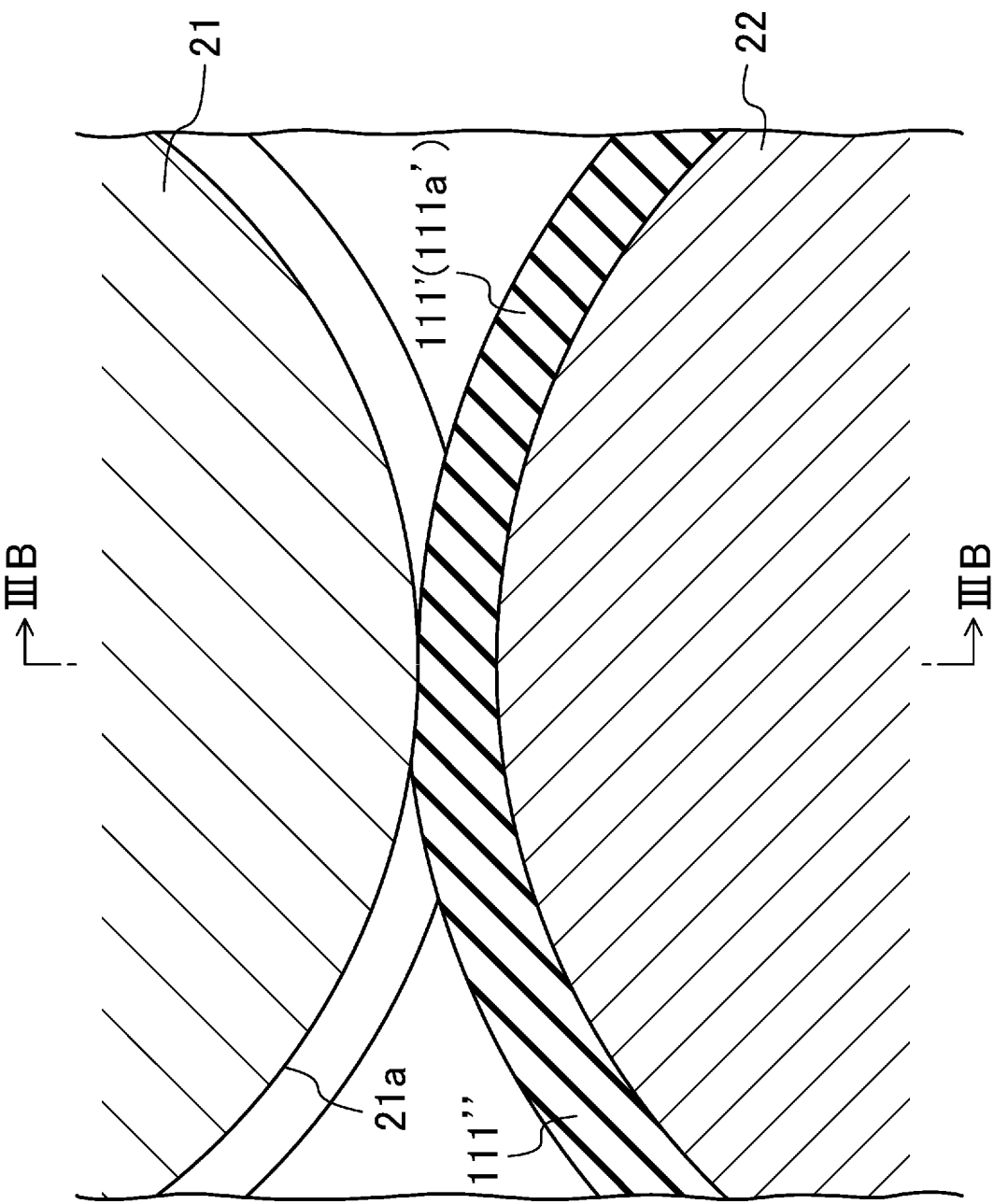
FIG. 3A is a diagram for showing how to prepare a core rubber sheet in a component preparation step in a production method 1-1 of a first embodiment.
Figure 3B:
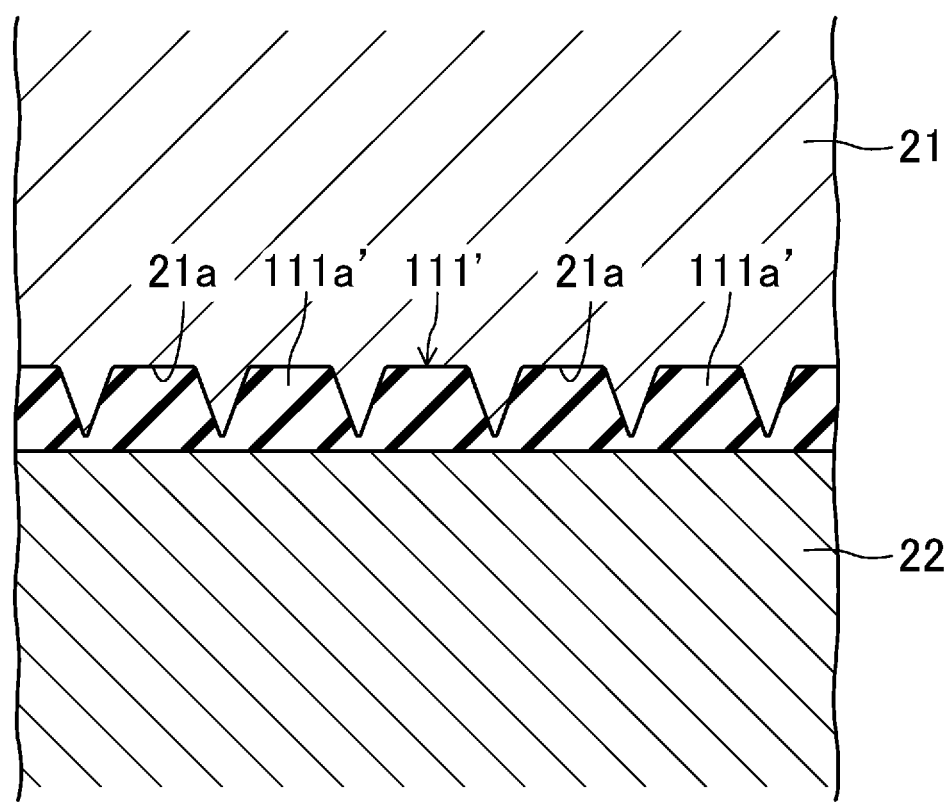
FIG. 3B is a cross-sectional view taken along line IIIB-IIIB of FIG. 3A.

The core rubber sheet 111' can be prepared in the following manner. As shown in FIGS. 3A and 3B, the uncrosslinked rubber sheet 111" is passed between a flat roll 22 and a core rubber-shaping roll 21 having trapezoidal grooves 21a that have a shape corresponding to the shape of the core rubber layer-forming portions 111a' of the core rubber sheet 111', extend in the circumferential direction, and are arranged adjacent to each other in the axial direction of the core rubber-shaping roll 21. In this manner, the trapezoidal grooves 21a on the outer peripheral surface of the core rubber-shaping roll 21 are pressed onto one of the surfaces of the uncrosslinked rubber sheet 111", thereby forming the core rubber layer-forming portions 111a'. The uncrosslinked rubber sheet 111" may be heated to increase the plasticity of the uncrosslinked rubber sheet 111". The core rubber sheet 111' can also be prepared by press molding or extrusion molding.

Fabric Material 112'

A woven fabric or a fabric of any other type which is to serve as the fabric material 112' undergoes, as necessary, one kind or two or more kinds of the following treatments: an adhesion treatment in which the fabric is soaked in an epoxy resin solution or an isocyanate resin solution and heated; an adhesion treatment in which the fabric is soaked in an RFL aqueous solution and heated; an adhesion treatment in which the fabric is soaked in rubber cement and dried; and an adhesion treatment in which rubber cement is applied to a surface of the fabric which will face the core rubber layer 111 and dried.

Adhesive Rubber Sheet 12'

A rubber component and compound ingredients are kneaded together by using a kneading machine such as a kneader or a Banbury mixer to obtain an uncrosslinked rubber composition. The uncrosslinked rubber composition is molded by calendar molding or the like, into a sheet, i.e., the adhesive rubber sheet 12'.

Cord 13'

A twisted yarn to form a cord 13' undergoes an adhesion treatment in which the twisted yarn is soaked in an RFL aqueous solution and heated, and/or an adhesion treatment in which the twisted yarn is soaked in rubber cement and dried. The twisted yarn may undergo, prior to these adhesion treatments, a base treatment in which the twisted yarn is soaked in an epoxy resin solution or an isocyanate resin solution and heated.

Reinforcing Fabric 14'

A woven fabric or a fabric of any other type which is to constitute a reinforcing fabric 14 undergoes one kind or two or more kinds of the following treatments: an adhesion treatment in which the fabric is soaked in an RFL aqueous solution and heated; an adhesion treatment in which the fabric is soaked in rubber cement and dried; and an adhesion treatment in which rubber cement is applied to a surface of the fabric to face the belt body 10 and dried. The fabric may undergo, prior to these adhesion treatments, a base treatment in which the fabric is soaked in an epoxy resin solution or an isocyanate resin solution and heated. In the case where a stretch rubber layer is provided instead of the reinforcing fabric 14, a stretch rubber sheet to constitute the stretch rubber layer is prepared in a similar manner to the adhesive rubber sheet 12'.

<Shaping Step>

Figure 4A:
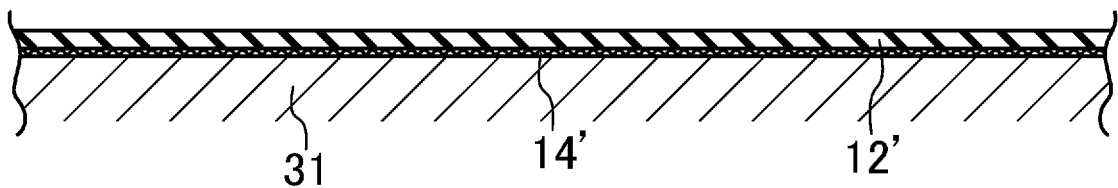
FIG. 4A is a first drawing showing a shaping step of the first production method.

In the shaping step, first, a shaping mandrel 31 having a cylindrical shape is rotatably supported on a shaft of a shaping machine (not shown) such that the axis of the shaping mandrel 31 extends horizontally. As shown in FIG. 4A, a reinforcing fabric 14' is wrapped around the shaping mandrel 31, and then, the adhesive rubber sheet 12' is wrapped around the reinforcing fabric 14'. The shaping mandrel 31 is chosen so as to correspond to the length of the V-belt B to be produced. In this step, the adhesive rubber sheet 12' is stacked on the reinforcing fabric 14'. Each of the reinforcing fabric 14' and the adhesive rubber sheet 12' is cut with an ultrasound cutter, air scissors, or the like, and its ends are lap jointed together. Alternatively, a reinforcing fabric 14' having a predetermined length may be formed into a cylindrical shape through joining of its both ends, and this cylindrical reinforcing fabric 14' may be fitted over the shaping mandrel 31. Alternatively, a reinforcing fabric 14' and an adhesive rubber sheet 12' may be stacked and integrated together into a layered structure, and then, this layered structure may be wrapped around the shaping mandrel 31. Alternatively, the layered structure having a predetermined length may be formed into a cylindrical shape through joining of its both ends such that the adhesive rubber layer 12 faces outside, and the resultant cylindrical structure may be fitted over the shaping mandrel 31. In the case of providing a stretch rubber layer, a stretch rubber sheet is used instead of the reinforcing fabric 14', and the shaping step is carried out in a similar manner.

Figure 4B:
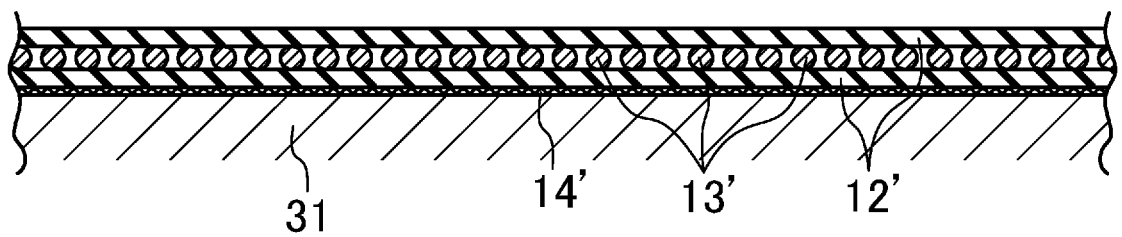
FIG. 4B is a second drawing showing the shaping step of the first production method.

Subsequently, as shown in FIG. 4B, a cord 13' is helically wound around the adhesive rubber sheet 12'. Another adhesive rubber sheet 12' is then wrapped over the wound cord 13'. Thus, a layer of the cord 13' is stacked on the adhesive rubber sheet 12', and the other adhesive rubber sheet 12' is stacked on the layer of the cord 13'. The adhesive rubber sheet 12' is cut with an ultrasound cutter, air scissors, or the like, and its ends are lap jointed together.

Figure 4C:
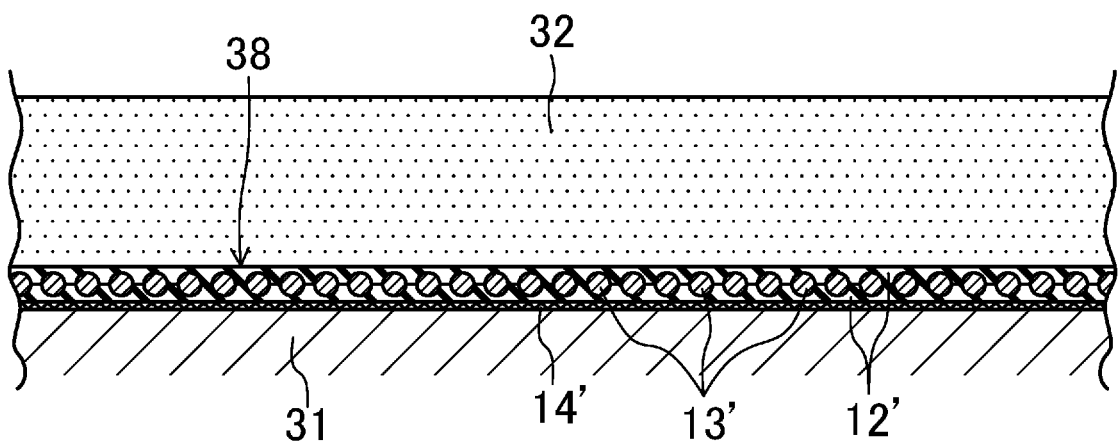
FIG. 4C is a third drawing showing the shaping step of the first production method.

Subsequently, as shown in FIG. 4C, the entire circumferential surface of the adhesive rubber sheet 12' is pressed with a roller 32. At this moment, the rubber flows and enters between turns of the cord 13', and the cord 13' is embedded between the pair of adhesive rubber sheets 12' so as to be fixed in position. As a result, these components are all integrated into a cylindrical tensile member 38. This operation may be carried out simultaneously with the wrapping of the adhesive rubber sheet 12' around the layer of the cord 13'.

Figure 4D:
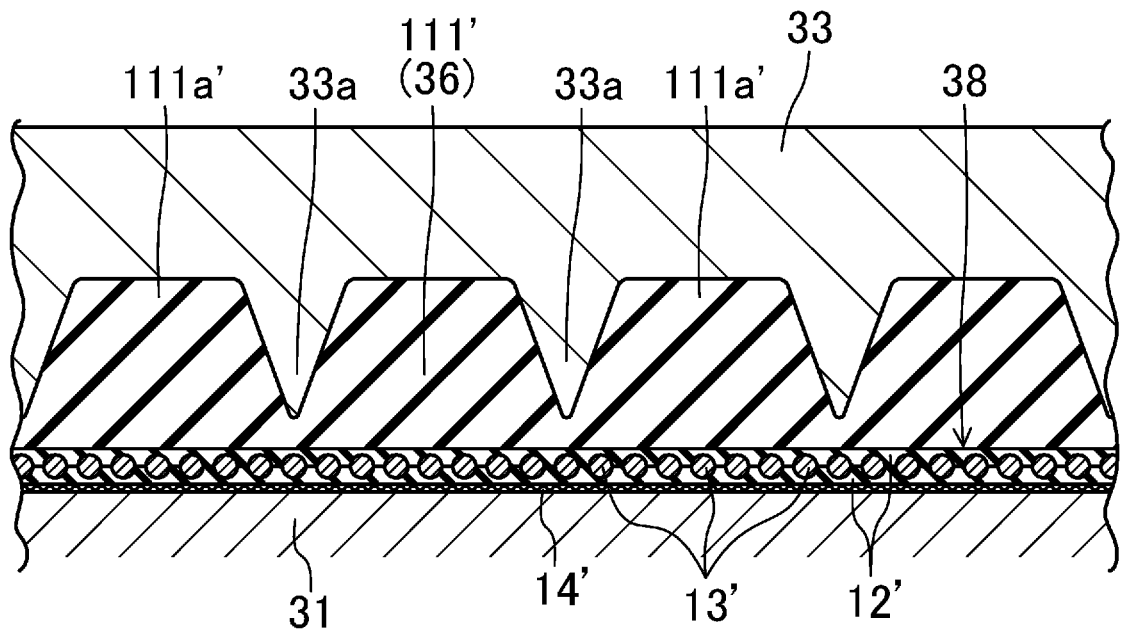
FIG. 4D is a fourth drawing showing the shaping step of the first production method.

Next, as shown in FIG. 4D, the core rubber sheet 111' is wrapped around the adhesive rubber sheet 12' of the tensile member 38 such that the core rubber layer-forming portions 111a' face outside and extend in the circumferential direction. At this time, a first comb-shaped guide 33 having a shape corresponding to the core rubber layer-forming portions 111a' of the core rubber sheet 111' is set outside the shaping mandrel 31 such that the first guide 33 extends in the axial direction and such that comb teeth 33a of the first guide 33 face the shaping mandrel 31. Each of the core rubber layer-forming portions 111a' of the core rubber sheet 111' is guided between an associated pair of the comb teeth 33a, and the core rubber sheet 111' is wrapped around, and stacked on, the adhesive rubber sheet 12' with the core rubber layer-forming portions 111a' extending in the circumferential direction with high precision. The core rubber sheet 111' is cut with an ultrasound cutter or the like, and its ends are butt jointed. To increase the joint strength, the butt joint is suitably achieved by abutting surfaces, of the core rubber sheet 111', which are oblique with respect to the thickness direction of the core rubber sheet 111'. Alternatively, a core rubber sheet 111' having a predetermined length may be formed into a cylindrical shape with its both ends joined together such that the core rubber layer-forming portions 111a' face outside, and this cylindrical core rubber sheet 111' may be fitted over the adhesive rubber sheet 12'. The cylindrical core rubber sheet 111' constitutes a shaped structure 36 which has a cylindrical shape. The shaped structure 36 is made of the uncrosslinked rubber composition and has, on its outer peripheral surface, the core rubber layer-forming portions 111a' which are the plurality of ridges extending in the circumferential direction and which are arranged adjacent to each other in the axial direction.

Figure 4E:
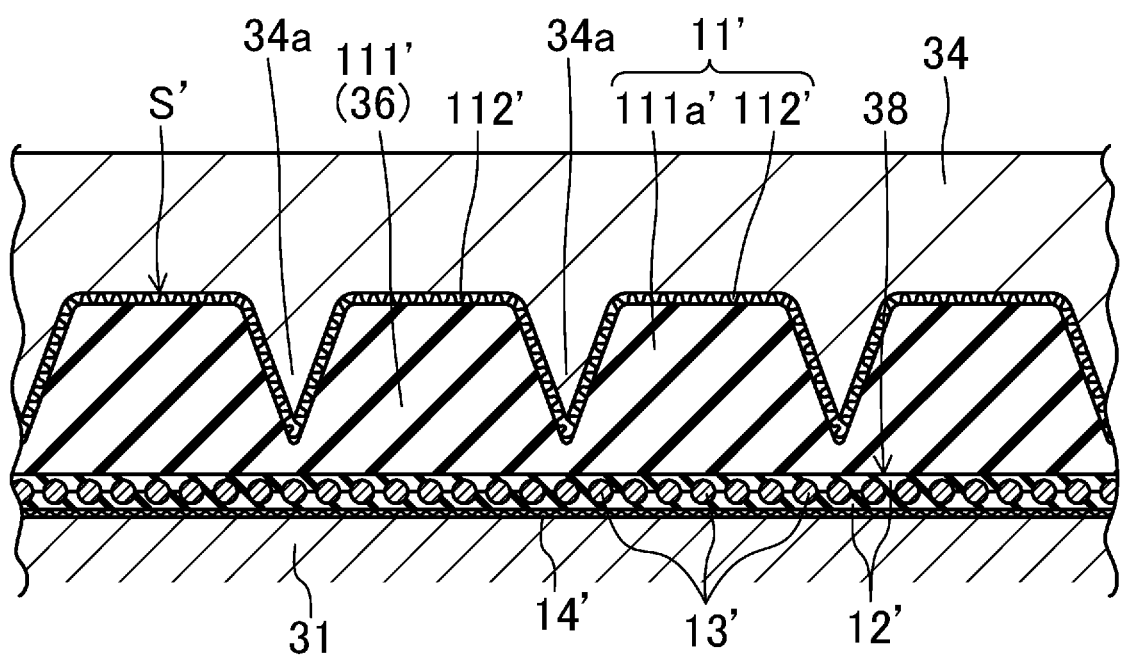
FIG. 4E is a fifth drawing showing the shaping step of the first production method.

Then, as shown in FIG. 4E, the fabric material 112' is wrapped around the core rubber sheet 111', thereby forming an uncrosslinked slab S'. In this process, instead of the first guide 33, a second comb-shaped guide 34 having a shape which leaves a gap corresponding to the thickness of the fabric material 112' between itself and the core rubber sheet 111' is set such that the second guide 34 extends in the axial direction and such that comb teeth 34a of the second guide 34 face the shaping mandrel 31. Thus, the fabric material 112' is forced into the gap between the core rubber sheet 111' and the second guide 34, and wraps around and covers the surface of the core rubber sheet 111' to be stacked on the core rubber sheet 111'.

Figure 4F:
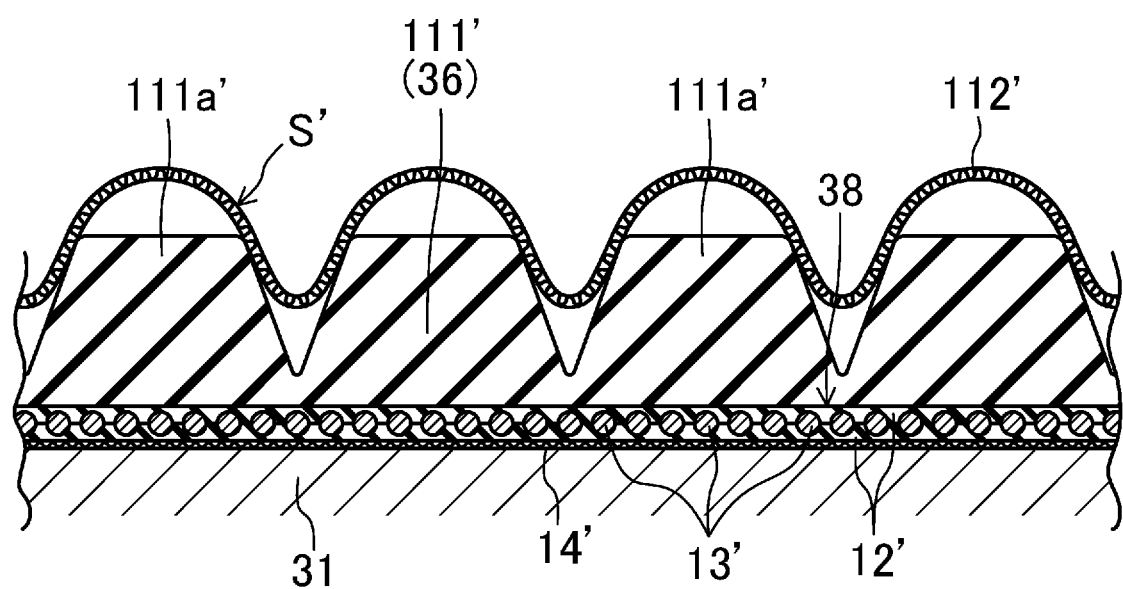
FIG. 4F is a sixth drawing showing the shaping step of the first production method.

Covering the surface of the core rubber sheet 111' with the fabric material 112' in advance in this manner, prior to heating the uncrosslinked slab S' including the shaped structure 36 and pressing this uncrosslinked slab S' toward the cylindrical mold 43 in the crosslinking step which will be described later, can substantially prevent the fabric material 112' from being stretched locally and significantly. This can substantially prevent seepage of rubber which may occur through such a portion stretched locally and significantly, and consequently reduce an abnormal noise which may be generated during running of the belt. In order to reduce local stretch of the fabric material 112' to a small amount, it is also preferable that: the fabric material 112' is subjected to a pleating process so that the cross section in the width direction is corrugated to have the same pitches as those of the core rubber layer-forming portions 111a' as shown in FIG. 4F, prior to covering the surface of the core rubber sheet 111' with the fabric material 112' using the second guide 34; the corrugated fabric material 112' is then set such that its portions protruding toward the core rubber sheet 111' (the core rubber layer-forming portions 111a') are positioned at grooves between the core rubber layer-forming portions 111a' of the core rubber sheet 111'; and the protruding portions are halfway fitted in the grooves so that the fabric material 112' loosely fits the core rubber sheet 111'. Such a pleating process may include continuously passing the fabric material 112' between a pair of plate-like or roll members for pleating the fabric material 112' which originally has a flat shape. Suitably, the fabric material 112' is subjected to a pleating process so that pitches of the pleated shape gradually decrease in a length direction.

The fabric material 112' may be closely fitted to the core rubber sheet 111' (the core rubber layer-forming portions 111a') like a single sheet, or may simply lie along the surface of the core rubber sheet 111' instead of being closely fitted. Ends of the fabric material 112' are butt jointed, lap jointed, or jointed, on an underlying layer, with a space between the ends. Alternatively, the fabric material 112' may be layered on the core rubber sheet 111' in the following manner: the fabric material 112' having a predetermined length is formed into a cylindrical shape with both ends jointed together; and the thus obtained cylindrical fabric material 112' is fitted over the core rubber sheet 111' using the second guide 34 so that the entire peripheral surface of the core rubber sheet 111' is covered with the fabric material 112'.

In the manner described above, an uncrosslinked slab S' having a cylindrical shape is formed on the shaping mandrel 31. Thus, the uncrosslinked slab S' includes the reinforcing fabric 14', the adhesive rubber sheet 12', the cord 13', the other adhesive rubber sheet 12', the core rubber sheet 111', and the fabric material 112' that are sequentially stacked toward the outside. The uncrosslinked slab S' includes the cylindrical shaped structure 36 having a cylindrical shape. In the uncrosslinked slab S', the plurality of core rubber layer-forming portions 111a' of the shaped structure 36 that are each covered with the fabric material 112' form compression layer-forming portions 11' that are to constitute the compression layers 11. The number of the compression layer-forming portions 11' included in the uncrosslinked slab S' is 20 to 100, for example.

<Crosslinking Step>

Figure 5A:
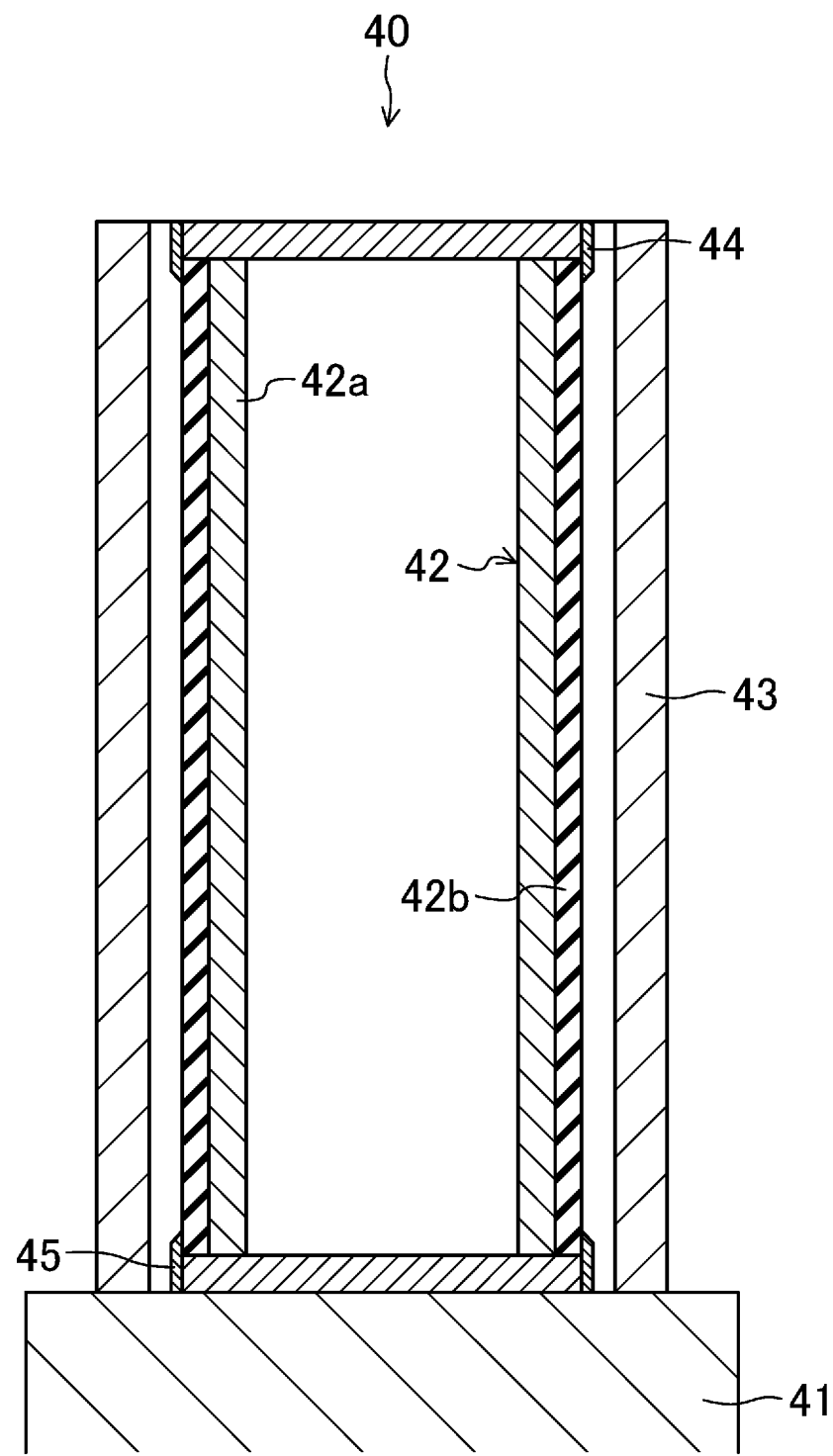
FIG. 5A is a cross-sectional view of a crosslinking apparatus.
Figure 5B:
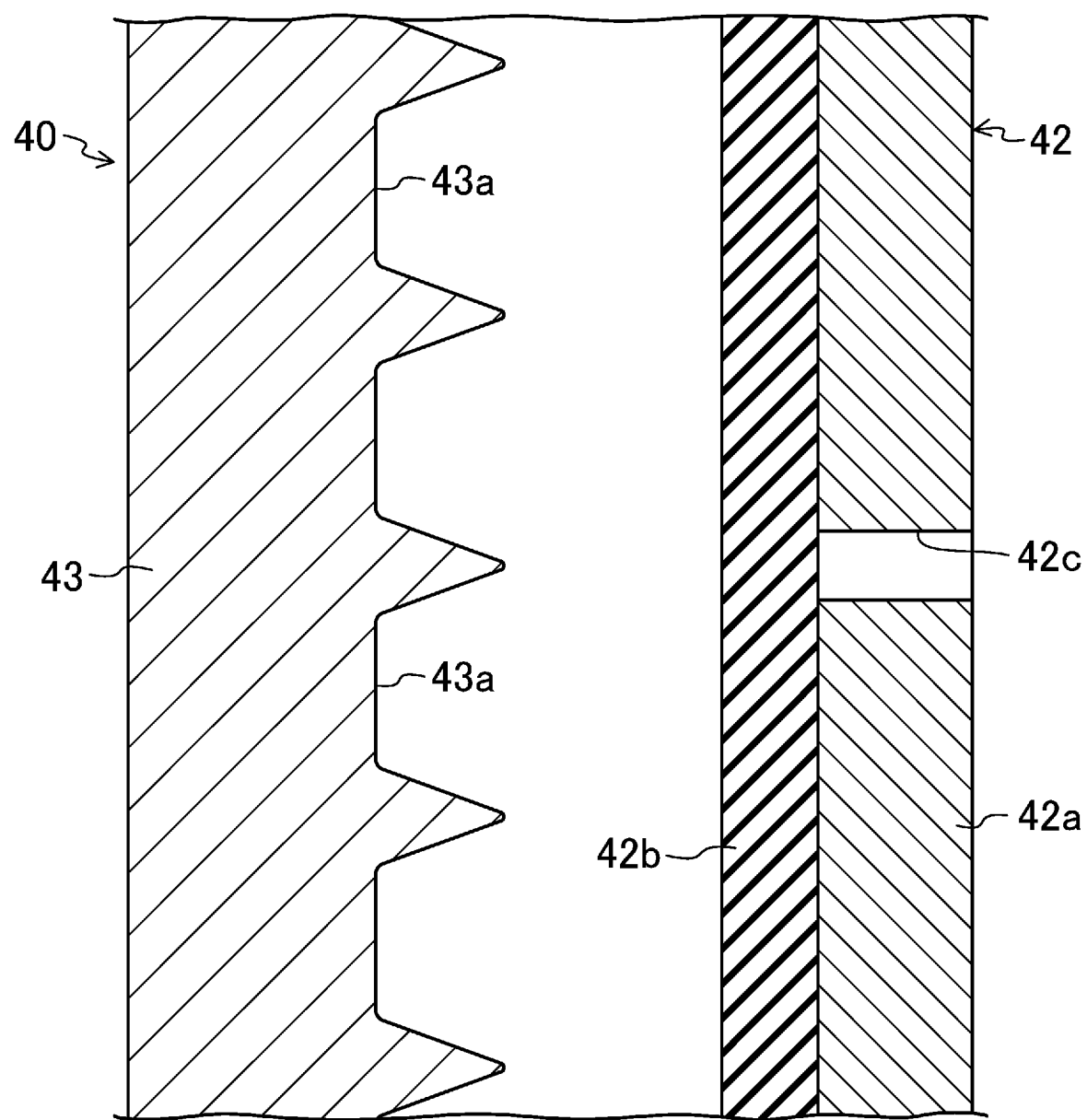
FIG. 5B shows, on an enlarged scale, a cross section of a portion of the crosslinking apparatus.

FIGS. 5A and 5B illustrate a crosslinking apparatus 40 for use in a crosslinking step.

The crosslinking apparatus 40 includes a base 41, a columnar expansion drum 42 standing on the base 41, a cylindrical mold 43 (belt mold) provided outside the expansion drum 42.

The expansion drum 42 includes a drum body 42a having a hollow columnar shape, and a cylindrical expansion sleeve 42b made of rubber and externally fitted over the outer periphery of the drum body 42a. The drum body 42a has, in its peripheral wall, a large number of air-passage holes 42c communicating with the inside. The expansion sleeve 42b and the drum body 42a are sealed by fixing rings 44 and 45 at both ends of the expansion sleeve 42b and the drum body 42a. The crosslinking apparatus 40 includes a pressurizing means (not shown) for applying a pressure by introducing high-pressure air into the drum body 42a. The high-pressure air introduced into the drum body 42a by the pressurizing means passes through the air-passage holes 42c to enter between the drum body 42a and the expansion sleeve 42b, and inflates the expansion sleeve 42b radially outward.

The cylindrical mold 43 is attachable to, and detachable from, the base 41. The cylindrical mold 43 is attached to the base 41 such that the cylindrical mold 43 and the expansion drum 42 are arranged concentrically with each other with a space interposed therebetween. The cylindrical mold 43 has, on its inner peripheral surface, a plurality of compression layer-shape grooves 43a which extend in the circumferential direction and are arranged adjacent to one another in the axial direction of the cylindrical mold 43. Each compression layer-shape groove 43a has a width decreasing toward its groove bottom. Specifically, each compression layer-shape groove 43a has the same isosceles trapezoidal cross section as the core rubber layer 111 of the V-belt B to be produced. The crosslinking apparatus 40 includes a heating means and a cooling means (both are not shown) for the cylindrical mold 43, so that the temperature of the cylindrical mold 43 can be controlled by these heating and cooling means.

In the crosslinking step, the uncrosslinked slab S' is removed from the shaping mandrel 31, and then, placed inside the cylindrical mold 43 of the crosslinking apparatus 40, which has been previously detached from the base 41. More specifically, the uncrosslinked slab S' is set in the cylindrical mold 43 such that each of the plurality of compression layer-forming portions 11' of the uncrosslinked slab S' (the core rubber layer-forming portions 111a' covered with the fabric material 112') is fitted in an associated one of the compression layer-shape grooves 43a. Fitting the compression layer-forming portions 11' in the compression layer-shape grooves 43a in advance, prior to heating the uncrosslinked slab S' including the shaped structure 36 and pressing this uncrosslinked slab S' toward the cylindrical mold 43 (as will be described later), reduces flowing of the rubber, thereby enabling production of a V-belt B having a stable structure. At this moment, the shaped structure 36 and the fabric material 112' are set inside the cylindrical mold 43 such that the shaped structure 36 is positioned inside, and the fabric material 112' is positioned outside, with respect to each other. The cylindrical mold 43 is chosen to correspond to the length of the V-belt B to be produced. Note that short fibers, resin powder, or the like may be attached to the inner peripheral surface of the cylindrical mold 43 and/or the outer peripheral surface of the uncrosslinked slab S' in advance.

Subsequently, as shown FIG. 6A, the cylindrical mold 43 within which the uncrosslinked slab S' has been set is attached to the base 41 such that the cylindrical mold 43 covers the expansion drum 42. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the tensile member 38 and the expansion sleeve 42b, and the shaped structure 36 and the tensile member 38 are in contact with each other.

Figure 6A:
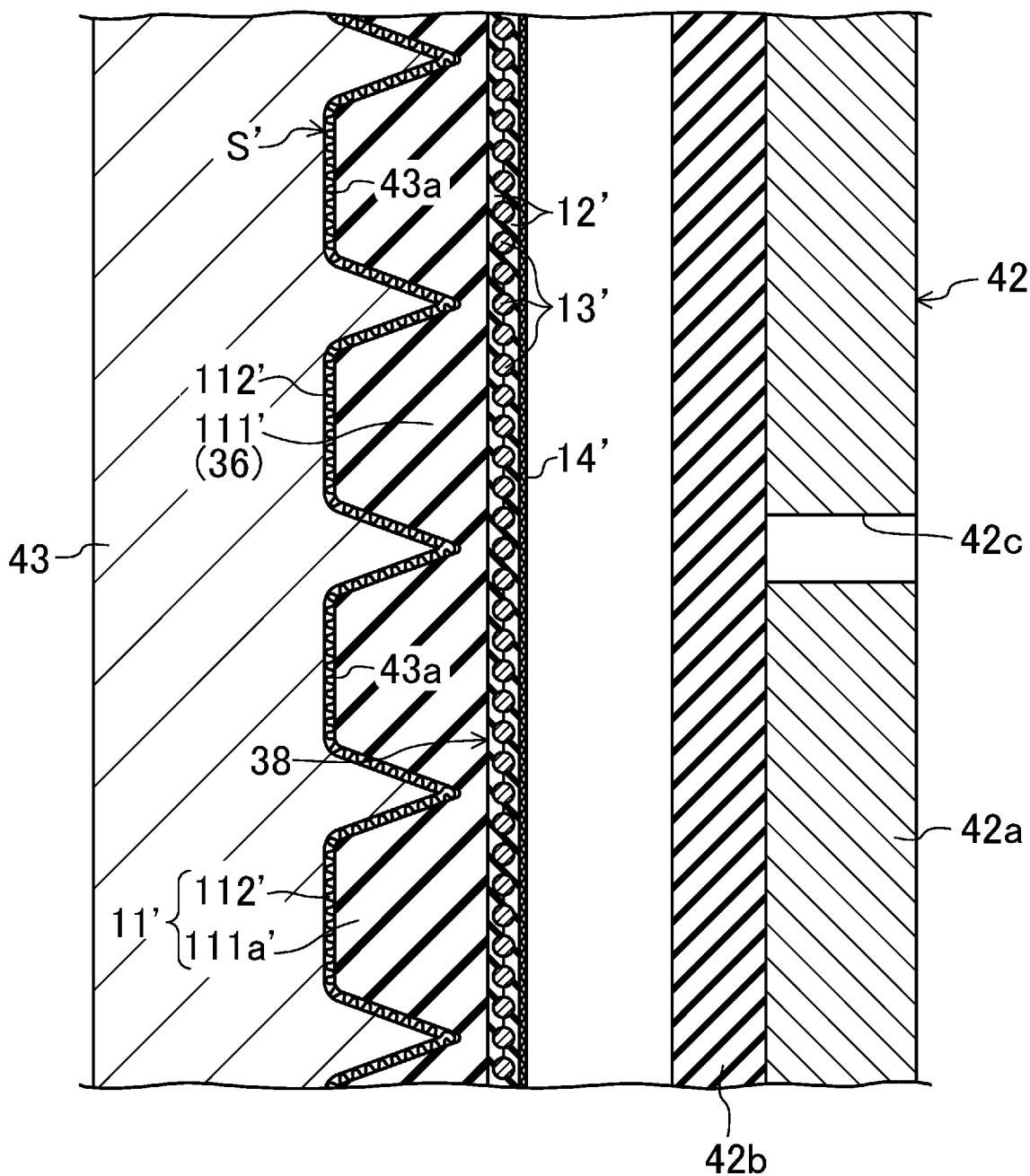
FIG. 6A is a first drawing showing a crosslinking step of the first production method.
Figure 6B:
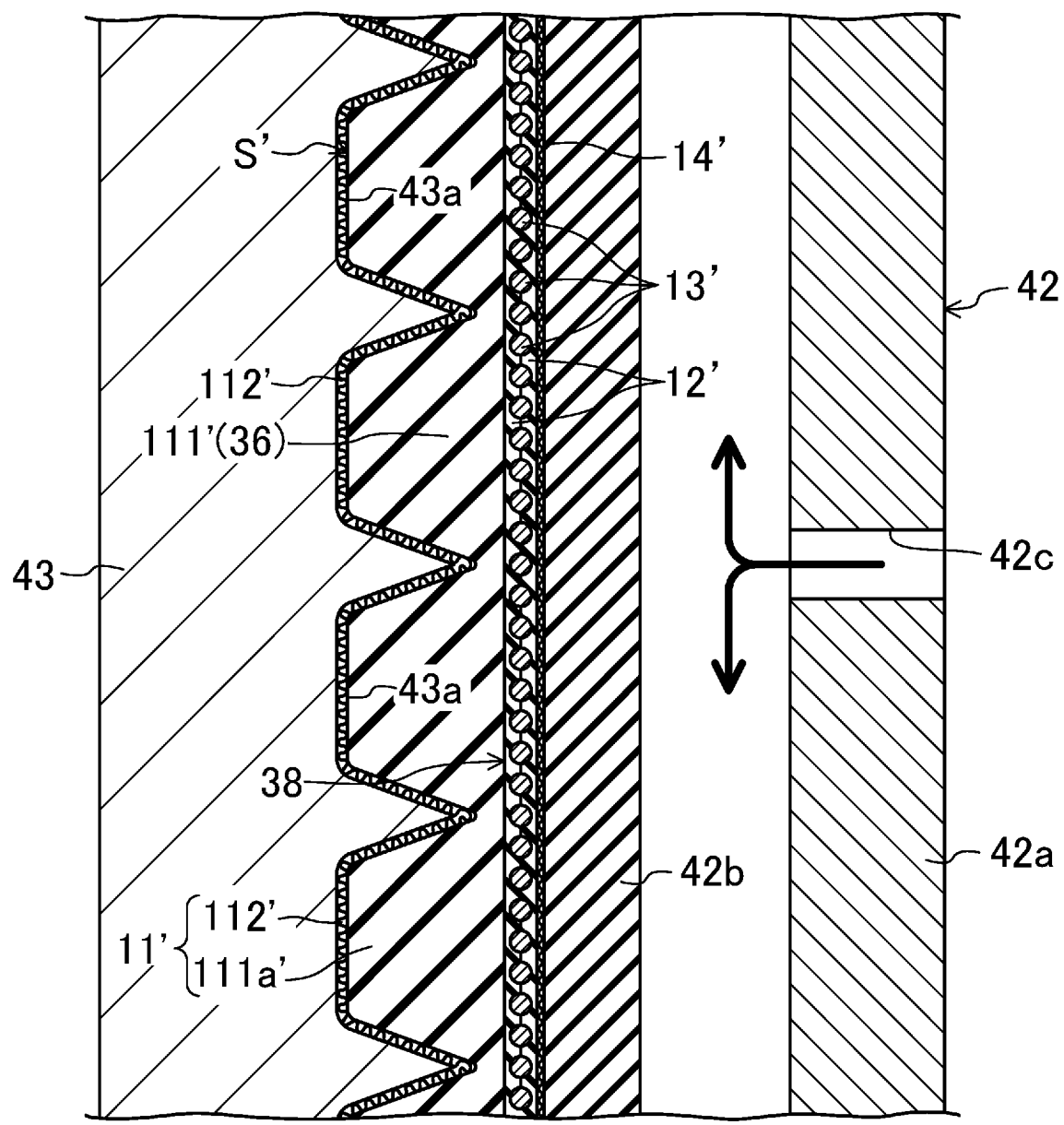
FIG. 6B is a second drawing showing the crosslinking step of the first production method.

As shown in FIG. 6B, the temperature of the cylindrical mold 43 is increased by the heating means, and the pressurizing means introduces high-pressure air into the drum body 42a of the expansion drum 42 so as to expand the expansion sleeve 42b radially outward. This state is maintained for a predetermined period of time. At this moment, while having each of the compression layer-forming portions 11' fitted in the associated one of the compression layer-shape grooves 43a of the cylindrical mold 43, the uncrosslinked slab S' is heated by the cylindrical mold 43 and pressed against the cylindrical mold 43 by the expansion sleeve 42b. That is, the pressing of the shaped structure 36 toward the cylindrical mold 43 is carried out by expanding the expansion sleeve 42b, located radially inward of the shaped structure 36, and pushing the shaped structure 36 from radially inside. In addition, the rubber components contained in the core rubber sheet 111' and the adhesive rubber sheets 12' that are included in the uncrosslinked slab S' are crosslinked and integrated with one another. As a result, a continuous structure of belt bodies 10 for a plurality of V-belts B, each including the core rubber layer 111 and the adhesive rubber layer 12, is produced. At the same time, the rubber components adhere to, and are combined with, the fabric material 112', the cord 13', and the reinforcing fabric 14'. A cylindrical belt slab S is thus formed eventually. The heating is carried out at a temperature of 100° C. to 180° C., for example. The pressurization is carried out at a pressure of 0.5 MPa to 2.0 MPa, for example. The process continues for 10 minutes to 60 minutes, for example.

Figure 7:
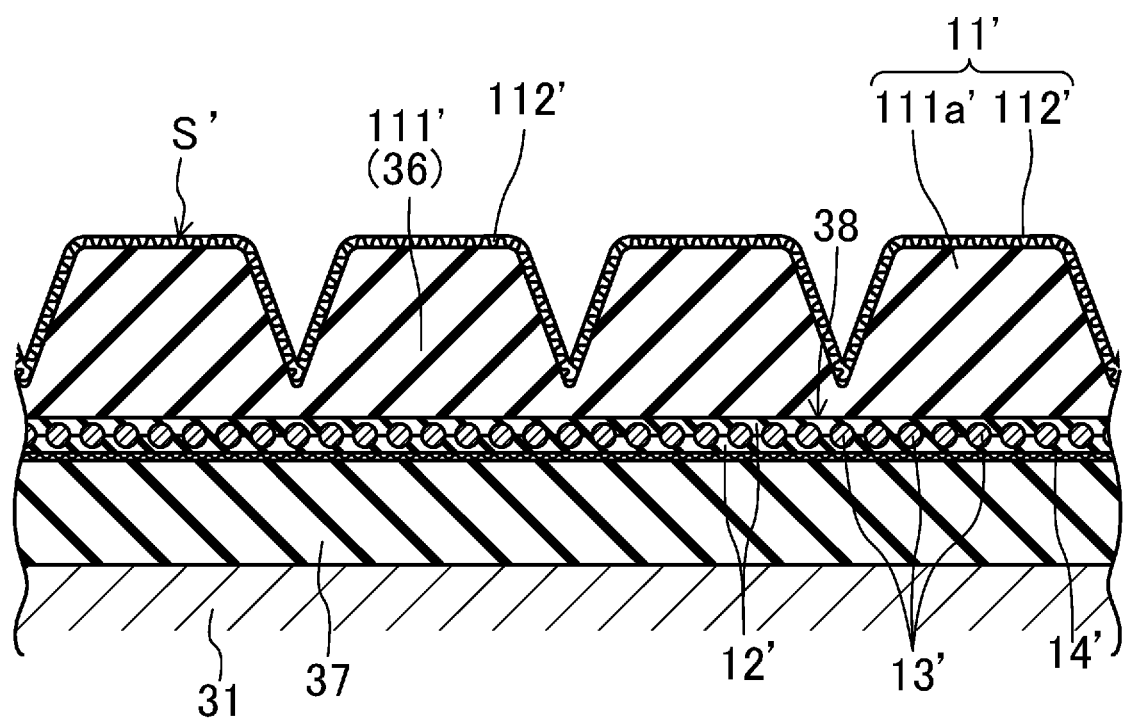
FIG. 7 shows a shaping step of a variation of the first production method.
Figure 8:
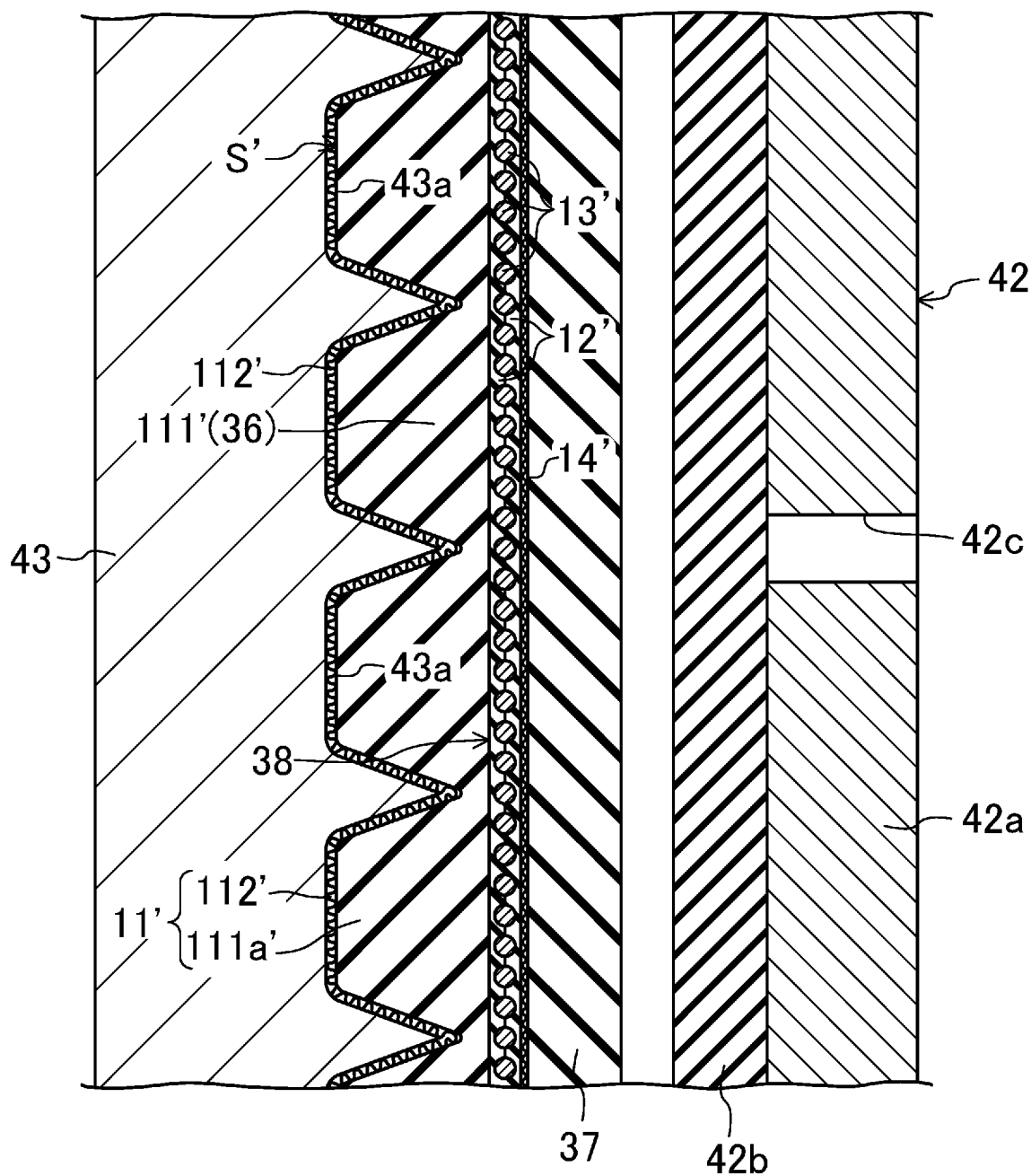
FIG. 8 shows a crosslinking step of the variation of the first production method.

The shaping step may be performed such that as shown in FIG. 7, a rubber-made shaping sleeve 37 is fitted over the shaping mandrel 31 to form an uncrosslinked slab S' on the shaping sleeve 37. In the crosslinking step, the uncrosslinked slab S' and the shaping sleeve 37 are together removed from the shaping mandrel 31. The removed slab S' and sleeve 37 are then set inside the cylindrical mold 43, as shown in FIG. 8. In other words, the shaping sleeve 37 may be interposed between the expansion drum 42 and the uncrosslinked slab S'.

<Finishing Step>

In a finishing step, the pressure inside the drum body 42a applied by the pressurizing means is released. After the cylindrical mold 43 is cooled by the cooling means, the cylindrical mold 43 is detached from the base 41, and the belt slab S that has been formed in the cylindrical mold 43 is removed from the cylindrical mold 43.

Figure 9:
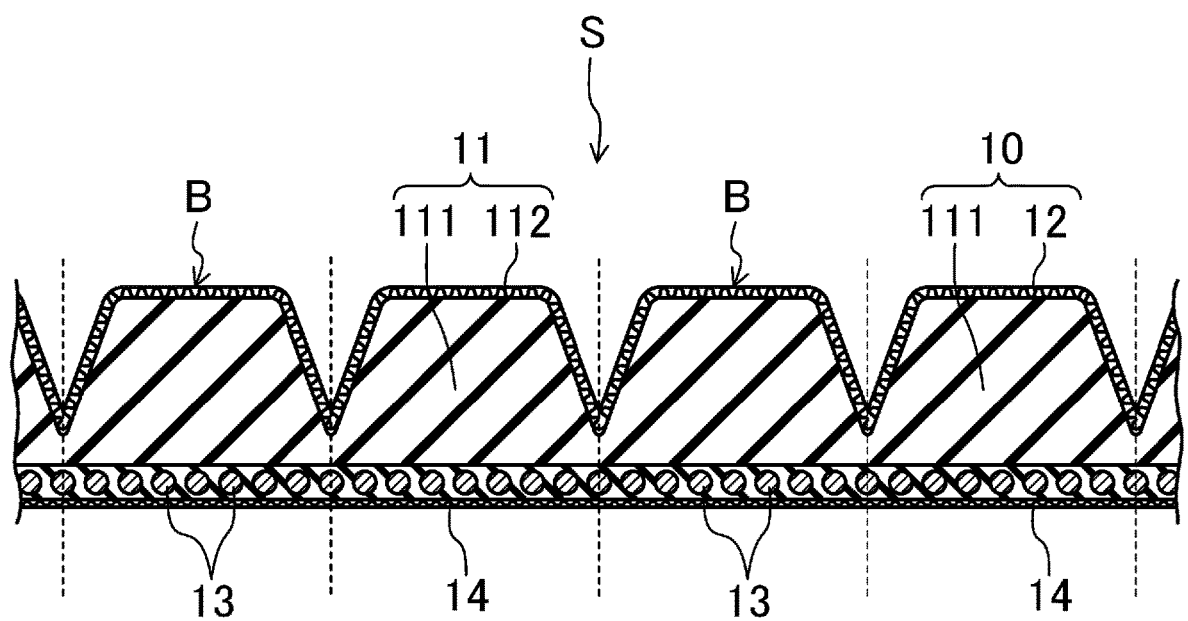
FIG. 9 shows a finishing step of the first production method.

As shown in FIG. 9, the belt slab S that has been removed from the cylindrical mold 43 is cut into ring-shaped pieces such that one ring-shaped piece corresponds to one compression layer-forming portion 11'. Each piece is turned inside out, thereby obtaining the V-belt B of the embodiment.

Efficiency in the production of a wrapped V-belt is low because the wrapped V-belt is shaped and crosslinked on a one-on-one basis. However, the production efficiency can be improved according to the above-described first production method, in which: the shaped structure 36 having a cylindrical shape and made of the uncrosslinked rubber composition contained in the crosslinked slab S' has, on its outer peripheral surface, a plurality of core rubber layer-forming portions 111a' which are a plurality of ridges extending in the circumferential direction and arranged adjacent to one another in the axial direction of the shaped structure 36; the cylindrical mold 43 has a plurality of compression layer-shape grooves 43a arranged adjacent to one another in the axial direction (the groove width direction) of the cylindrical mold 43; a belt slab S is formed while each of compression layer-forming portions 11 to be a compression layer 11 is fitted in an associated one of the compression layer-shape grooves 43a of the cylindrical mold 43, wherein the compression layer-forming portions 11 are the plurality of core rubber layer-forming portions 111a' of the shaped structure 36 each of which is covered with the fabric material 112' to be a covering fabric 113; and the thus obtained belt slab S is cut into ring-shaped pieces such that one ring-shaped piece corresponds to one compression layer-forming portions 11', which means that a plurality of V-belts B can be produced out of one belt slab S. High production efficiency is achieved in this manner.

(Second Production Method)

A second production method will be described below with reference to FIG. 10.

According to the second production method, the core rubber sheet 111' is cut, in the shaping step, so as to have a length which corresponds to the length of the V-belt B to be produced. Ends of the core rubber sheet 111' are cut with an ultrasound cutter or the like, and are butt jointed with an ultrasound welder or the like such that the core rubber layer-forming portions 111a' face outside and extend in the circumferential direction. To increase the joint strength, the butt joint is suitably achieved by abutting surfaces, of the core rubber sheet 111', which are oblique with respect to the thickness direction of the core rubber sheet 111'. A shaped structure 36 which has a cylindrical shape is produced in this manner. The shaped structure 36 is made of the uncrosslinked rubber composition and has, on its outer peripheral surface, the core rubber layer-forming portions 111a' which are the ridges extending in the circumferential direction and arranged adjacent to each other in the axial direction.

Next, a fabric material 112' is wrapped around the shaped structure 36 such that the fabric material 112' covers, and is stacked on, the surface of the shaped structure 36. At this moment, each of the plurality of the core rubber layer-forming portions 111a' is covered with the fabric material 112'. The core rubber layer-forming portions 111a' covered with the fabric material 112' constitute compression layer-forming portions 11'. Covering the surface of the core rubber sheet 111' with the fabric material 112' in advance in this manner, prior to heating the shaped structure 36 and pressing this shaped structure 36 toward the cylindrical mold 43 in the crosslinking step which will be described later, can substantially prevent the fabric material 112' from being stretched locally and significantly. This can substantially prevent seepage of rubber which may occur through such a portion stretched locally and significantly, and consequently reduce an abnormal noise which may be generated during running of the belt. The fabric material 112' may be closely fitted to the core rubber sheet 111' (the core rubber layer-forming portions 111a') like a single sheet, or may simply lie along the surface of the core rubber sheet 111' instead of being closely fitted. Ends of the fabric material 112' are butt jointed, lap jointed, or jointed, on an underlying layer, with a space between the ends. Alternatively, a fabric material 112' having a predetermined length may be formed into a cylindrical shape through joining of its both ends, and this cylindrical fabric material 112' may be fitted over the shaped structure 36 so as to cover the entire peripheral surface of the shaped structure 36.

Further, similarly to the steps of the first production method shown in FIGS. 4A to 4C, the reinforcing fabric 14', the adhesive rubber sheet 12', the cord 13', and another adhesive rubber sheet 12' are stacked on the shaping mandrel 31 in the stated order. After that, the entire circumferential surface of the stacked structure is pressed with a roller 32 on the adhesive rubber sheet 12' to integrate the stacked structure and produce a cylindrical tensile member 38.

Figure 10:
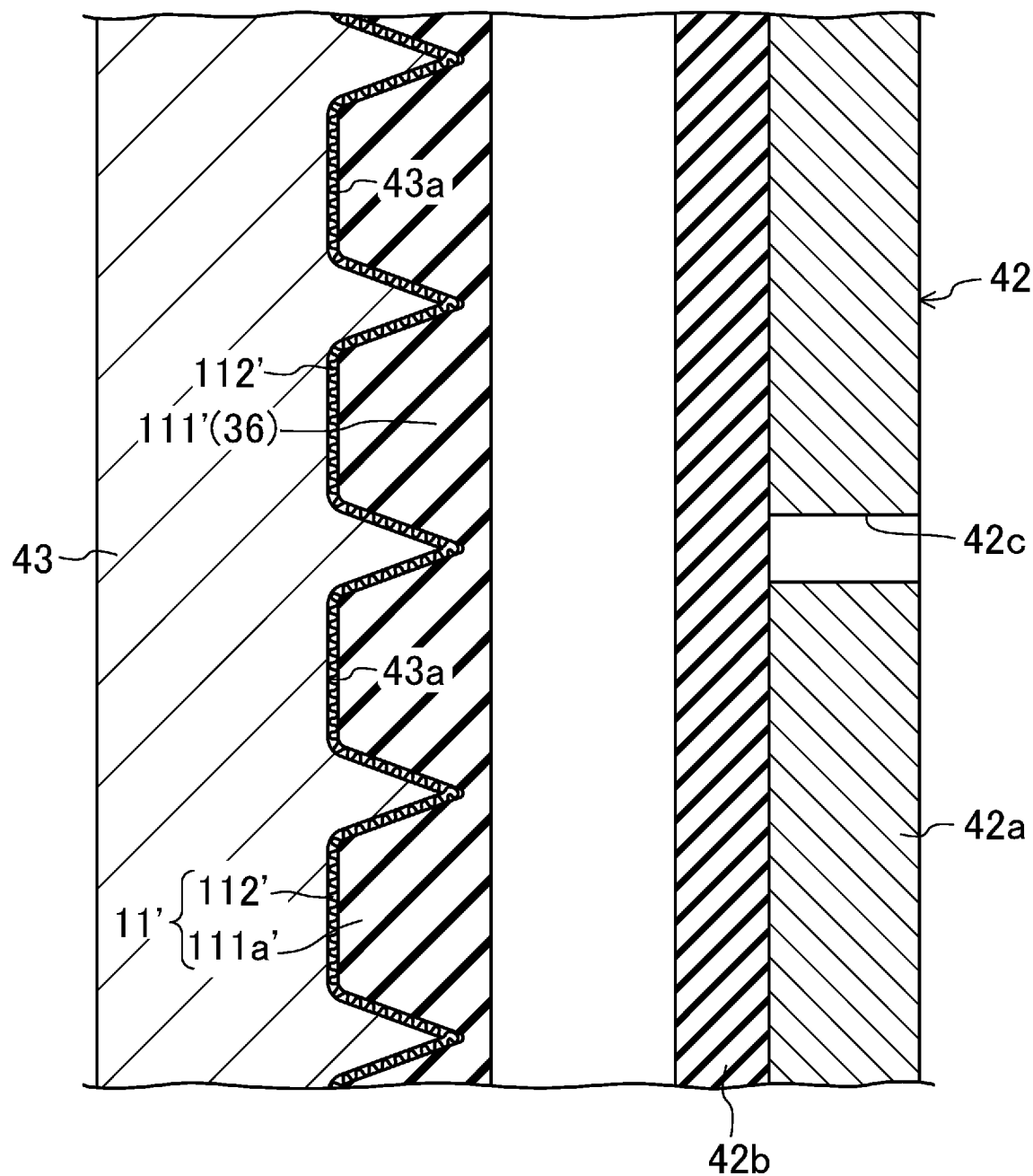
FIG. 10 shows a crosslinking step of a second production method.

In a crosslinking step, the shaped structure 36 covered with the fabric material 112' is set in a cylindrical mold 43, as shown in FIG. 10. More specifically, the shaped structure 36 covered with the fabric material 112' is set in the cylindrical mold 43 such that each of the plurality of compression layer-forming portions 11' comprised of the core rubber layer-forming portions 111a' covered with the fabric material 112' is fitted in an associated one of compression layer-shape grooves 43a of the cylindrical mold 43. Fitting the compression layer-forming portions 11' in the compression layer-shape grooves 43a in advance, prior to heating the shaped structure 36 and pressing this shaped structure 36 toward the cylindrical mold 43 (as will be described later), reduces flowing of the rubber, thereby enabling production of a V-belt B having a stable structure. At this moment, the shaped structure 36 and the fabric material 112' are set inside the cylindrical mold 43 such that the shaped structure 36 is positioned inside, and the fabric material 112' is positioned outside, with respect to each other. The cylindrical mold 43 is chosen to correspond to the length of the V-belt B to be produced. Note that short fibers, resin powder, or the like may be attached to the inner peripheral surface of the cylindrical mold 43 and/or the outer peripheral surface of the fabric material 112' in advance.

The tensile member 38 is removed from the shaping mandrel 31, and is then fitted in the shaped structure 36 set in the cylindrical mold 43, such that the outer peripheral surface of the tensile member 38 comes into contact with the inner peripheral surface of the shaped structure 36, that is, so as to be in a positional relationship as in FIG. 6A illustrating the first production method.

Then, the cylindrical mold 43 within which the shaped structure 36 covered with the fabric material 112' and the tensile member 38 have been set is attached to the base 41 such that the cylindrical mold 43 covers the expansion drum 42. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the tensile member 38 and the expansion sleeve 42b, and the shaped structure 36 and the tensile member 38 are in contact with each other.

Note that the shaped structure 36 covered with the fabric material 112' may be fitted over the tensile member 38 to produce the uncrosslinked slab S'. This uncrosslinked slab S' may be placed in the cylindrical mold 43.

Alternatively, the shaped structure 36 covered with the fabric material 112' may be placed in the cylindrical mold 43, and the tensile member 38 may be placed outside the expansion drum 42. In this case, a gap is interposed between the shaped structure 36 covered with the fabric material 112' and set in the cylindrical mold 43, and the tensile member 38 set over the expansion drum 42. When the expansion sleeve 42b of the expansion drum 42 is expanded radially outward, the tensile member 38 expands radially outward and comes into contact with the shaped structure 36 covered with the fabric material 112'. The tensile member 38 and the shaped structure 36 covered with the fabric material 112' in this state are heated by the cylindrical mold 43, and are pressed toward the cylindrical mold 43 by the expansion sleeve 42b. A belt slab S is formed as a result. That is, the pressing of the shaped structure 36 toward the cylindrical mold 43 is carried out by expanding the expansion sleeve 42b, located radially inward of the shaped structure 36, and pushing the shaped structure 36 from radially inside.

The other features and advantages are the same as those of the first production method.

(Third Production Method)

Figure 11:
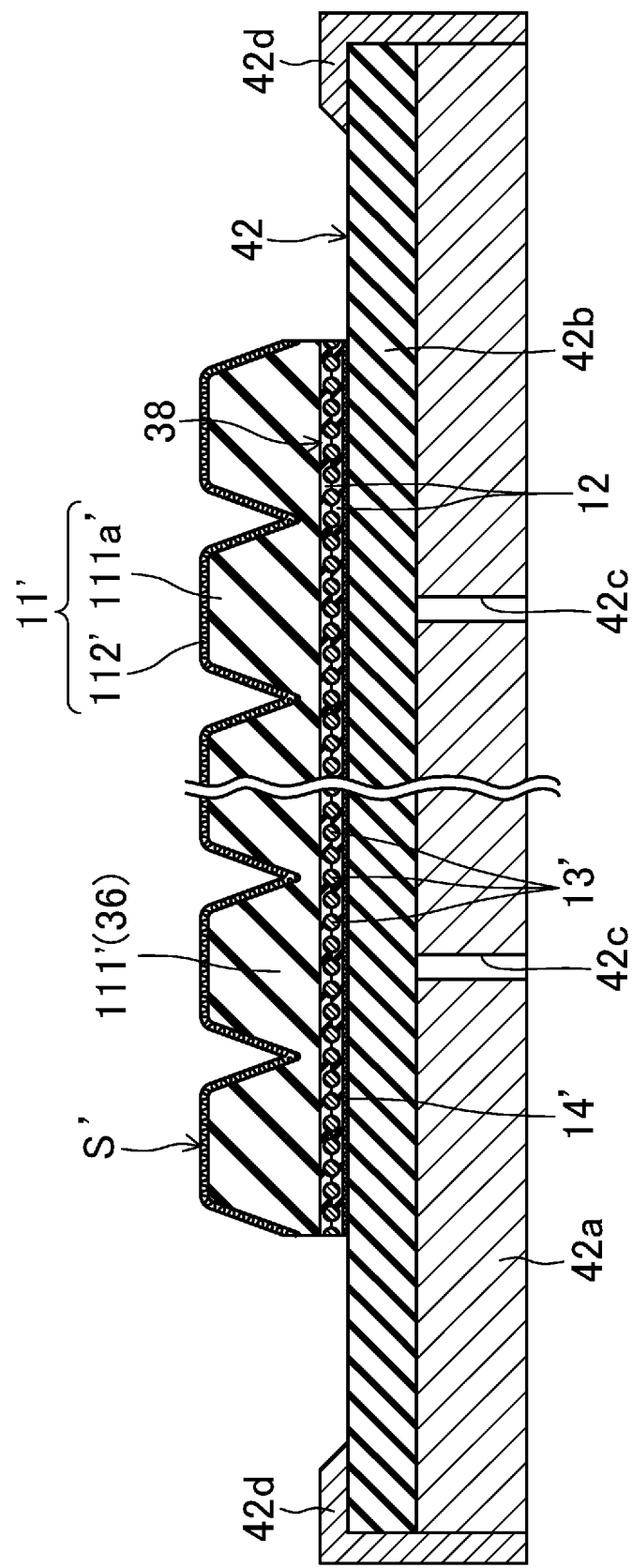
FIG. 11 shows a shaping step of a third production method.

A third production method will be described with reference to FIGS. 11, 12A and 12B.

According to the third production method, a crosslinking apparatus 40 including an expansion drum 42 that is attachable to, and detachable from, a base 41 is used. The expansion drum 42 serves also as a shaping mandrel. The expansion drum 42 includes a drum body 42a having a hollow columnar shape, and an expansion sleeve 42b made of rubber and externally fitted over the outer periphery of the drum body 42a. The expansion drum 42 has a basic configuration similar to the configuration of the expansion drum used in the first production method. Both ends of the expansion sleeve 42b are fixed to the drum body 42a by fixing rings 42d, and the expansion sleeve 42b and the drum body 42a are sealed at the both ends.

In the shaping step, the expansion drum 42 is rotatably supported on a shaft of a shaping machine (not shown) such that the axis of the expansion drum 42 extends horizontally. As shown in FIG. 11, similarly to the first production method, the reinforcing fabric 14', the adhesive rubber sheet 12', the cord 13', another adhesive rubber sheet 12', the core rubber sheet 111', and the fabric material 112' are stacked on the expansion drum 42, thereby forming an uncrosslinked slab S'.

Figure 12A:
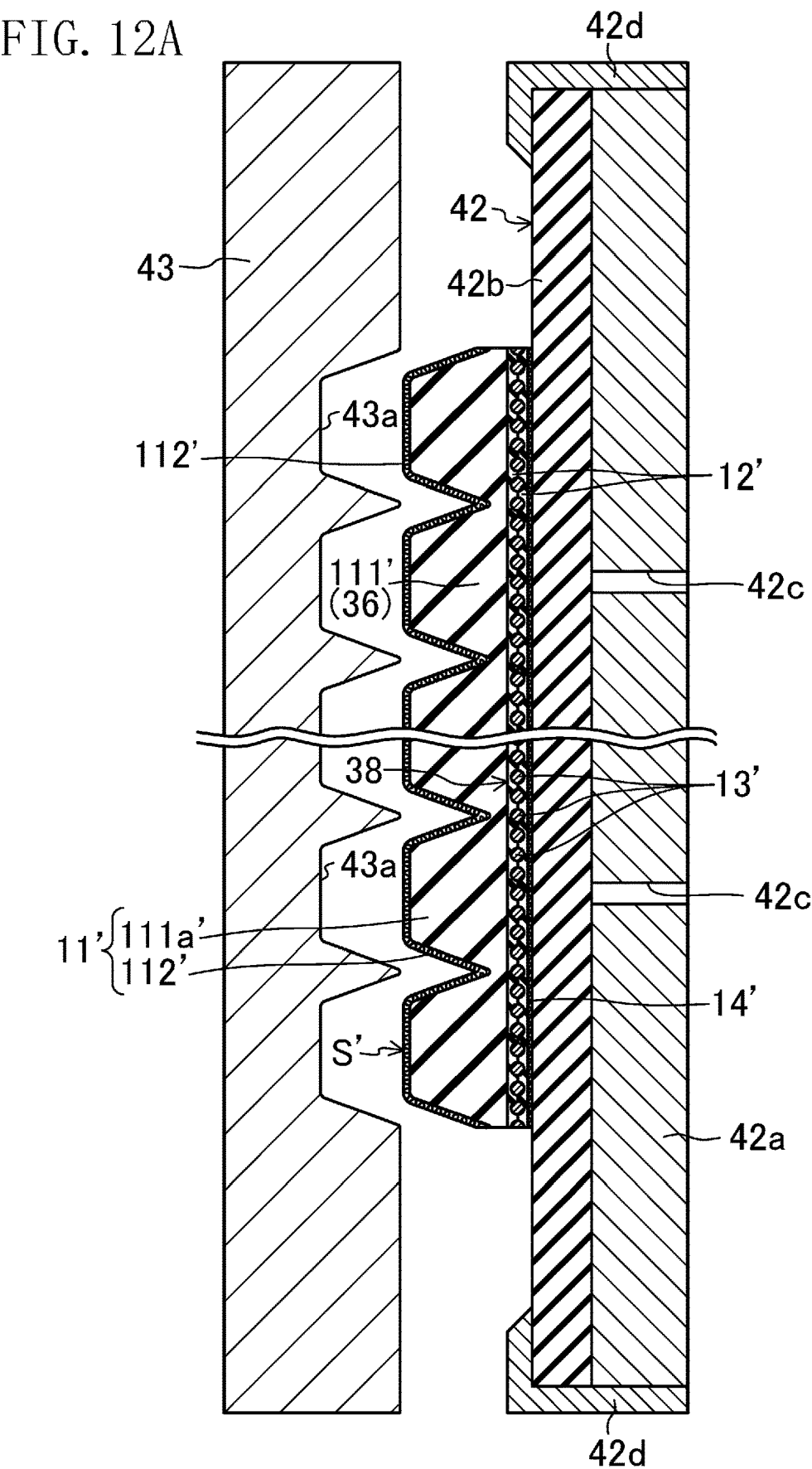
FIG. 12A is a first drawing showing a crosslinking step of the third production method.

In a crosslinking step, as shown FIG. 12A, the expansion drum 42 on which the uncrosslinked slab S' has been formed is detached from the shaping machine, and the expansion drum 42 is attached to the crosslinking apparatus 40 so as to stand on the base 41 of the crosslinking apparatus 40.

Next, the cylindrical mold 43 is attached to the base 41 such that the cylindrical mold 43 covers the expansion drum 42. At this moment, the shaped structure 36 (which is a cylindrically-shaped core rubber sheet 111') and the fabric material 112' that are included in the uncrosslinked slab S' are set inside the cylindrical mold 43 such that the shaped structure 36 is positioned inside, and the fabric material 112' is positioned outside, with respect to each other. The cylindrical mold 43 is chosen to correspond to the length of the V-belt B to be produced, and have an inner diameter larger than an outer diameter of the uncrosslinked slab S' formed on the expansion drum 42. The uncrosslinked slab S' is positioned such that the distal end of each of the compression layer-forming portions 11' is positioned at an opening of an associated one of the compression layer-shape grooves 43a of the cylindrical mold 43. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, the tensile member 38 is provided on the expansion sleeve 42b, and the shaped structure 36 and the tensile member 38 are in contact with each other. Note that short fibers, resin powder, or the like may be attached to the inner peripheral surface of the cylindrical mold 43 and/or the outer peripheral surface of the uncrosslinked slab S' in advance.

Figure 12B:
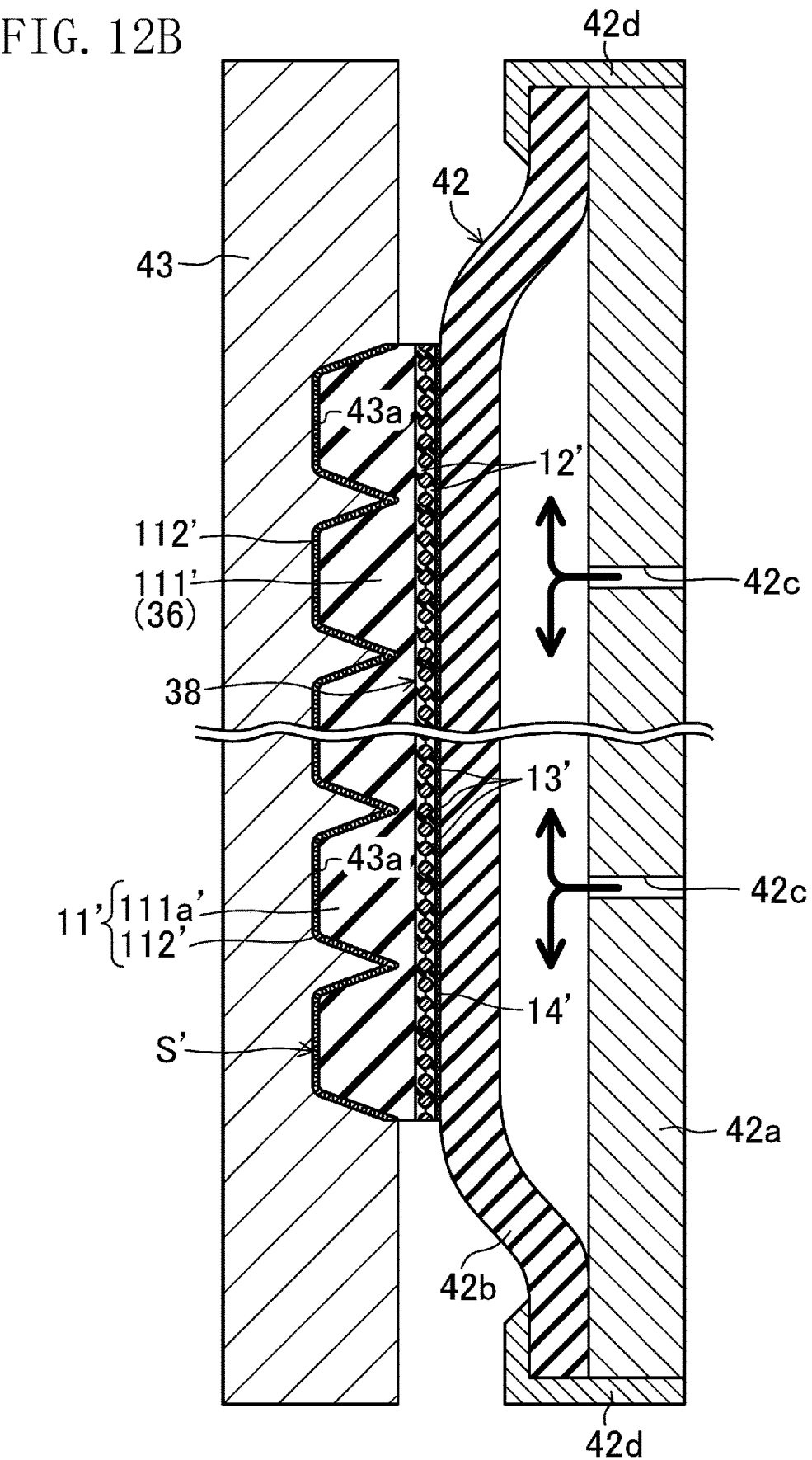
FIG. 12B is a second drawing showing the crosslinking step of the third production method.

As shown in FIG. 12B, the temperature of the cylindrical mold 43 is increased by the heating means, and the pressurizing means introduces high-pressure air into the drum body 42a of the expansion drum 42 so as to expand the expansion sleeve 42b radially outward. This state is maintained for a predetermined period of time. At this moment, the uncrosslinked slab S' is pushed by the expansion sleeve 42b and expands radially outward, causing each of the compression layer-forming portions 11' to enter, and be fitted in, the associated one of the compression layer-shape grooves 43a of the cylindrical mold 43. In this state, the uncrosslinked slab S' is heated by the cylindrical mold 43 and pressed against the cylindrical mold 43 by the expansion sleeve 42b, thereby forming a belt slab S. That is, the pressing of the shaped structure 36 toward the cylindrical mold 43 is carried out by expanding the expansion sleeve 42b, located radially inward of the shaped structure 36, and pushing the shaped structure 36 from radially inside.

The other features and advantages are the same as those of the first production method.

(Fourth Production Method)

A fourth production method will be described below with reference to FIG. 13.

According to the fourth production method, a cylindrical shaped structure 36 covered with the fabric material 112' is produced in the shaping step, similarly to the second production method. Further, similarly to the third production method, a crosslinking apparatus 40 including an expansion drum 42 that is attachable to, and detachable from, a base 41 is used. The expansion drum 42 is rotatably supported on a shaft of a shaping machine (not shown) such that the axis of the expansion drum 42 extends horizontally. Similarly to the second production method (see FIGS. 4A to 4C illustrating the first production method), a cylindrical tensile member 38 is formed on the expansion drum 42.

Figure 13:
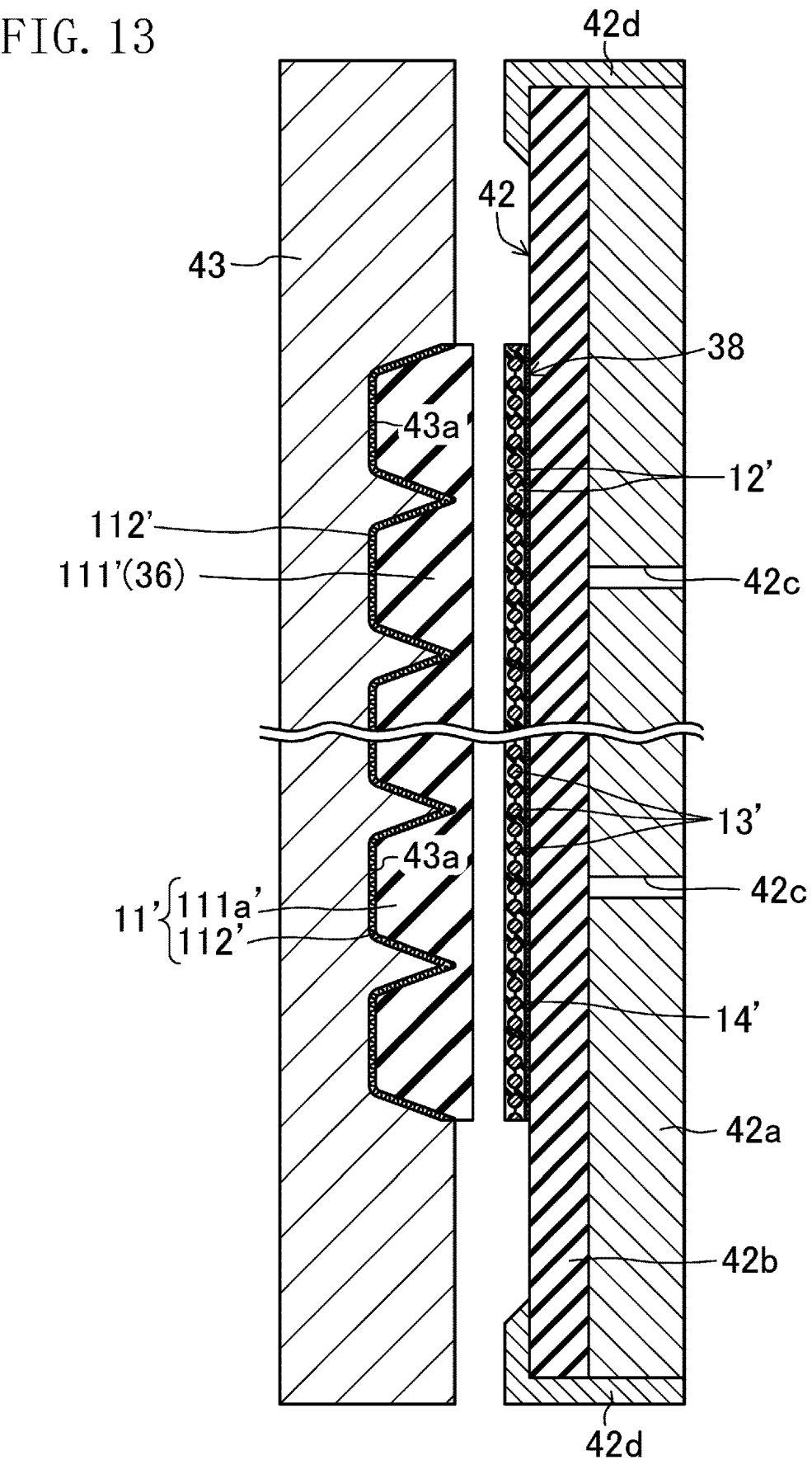
FIG. 13 shows a crosslinking step of a fourth production method.

Similarly to the second production method, in a crosslinking step, the shaped structure 36 covered with the fabric material 112' is placed in the cylindrical mold 43, as shown in FIG. 13. More specifically, the shaped structure 36 covered with the fabric material 112' is set in the cylindrical mold 43 such that each of the plurality of compression layer-forming portions 11' comprised of the core rubber layer-forming portions 111a' covered with the fabric material 112' is fitted in an associated one of compression layer-shape grooves 43a of the cylindrical mold 43. Fitting the compression layer-forming portions 11' in the compression layer-shape grooves 43a in advance, prior to heating the shaped structure 36 and pressing this shaped structure 36 toward the cylindrical mold 43 (as will be described later), reduces flowing of the rubber, thereby enabling production of a V-belt B having a stable structure. At this moment, the shaped structure 36 and the fabric material 112' are set inside the cylindrical mold 43 such that the shaped structure 36 is positioned inside, and the fabric material 112' is positioned outside, with respect to each other. The cylindrical mold 43 is chosen to correspond to the length of the V-belt B to be produced. Note that short fibers, resin powder, or the like may be attached to the inner peripheral surface of the cylindrical mold 43 and/or the outer peripheral surface of the fabric material 112' in advance.

The expansion drum 42 on which the tensile member 38 has been formed is detached from the shaping machine, and the expansion drum 42 is attached to the crosslinking apparatus 40 so as to stand on the base 41 of the crosslinking apparatus 40. Then, the cylindrical mold 43 within which the shaped structure 36 covered with the fabric material 112' has been set is attached to the base 41 such that the cylindrical mold 43 covers the expansion drum 42. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the shaped structure 36 and the tensile member 38, and the tensile member 38 is formed on the expansion sleeve 42b.

The temperature of the cylindrical mold 43 is increased by the heating means, and the pressurizing means introduces high-pressure air into the drum body 42a of the expansion drum 42 so as to expand the expansion sleeve 42b radially outward. This state is maintained for a predetermined period of time. At this moment, the tensile member 38 is pressed by the expansion sleeve 42b and expands radially outward to come into contact with the shaped structure 36. While each of the compression layer-forming portions 11' is fitted in an associated one of the compression layer-shape grooves 43a of the cylindrical mold 43, the tensile member 38 and the shaped structure 36 covered with the fabric material 112' are heated by the cylindrical mold 43 and pressed towards the cylindrical mold 43 by the expansion sleeve 42b, thereby molding a belt slab S. That is, the pressing of the shaped structure 36 toward the cylindrical mold 43 is carried out by expanding the expansion sleeve 42b, located radially inward of the shaped structure 36, and pushing the shaped structure 36 from radially inside.

The other features and advantages are the same as those of the second production method.

(Fifth Production Method)

Figure 14A:
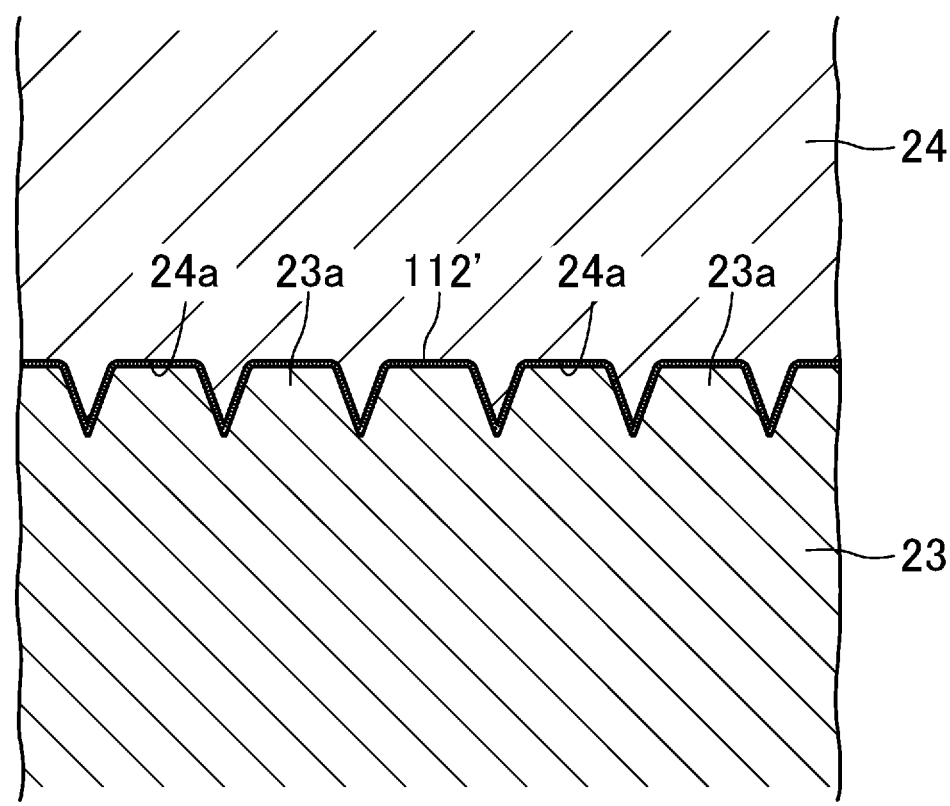
FIG. 14A is a first drawing showing how to affix a fabric material to a core rubber sheet in a component preparation step of a fifth production method.
Figure 14B:
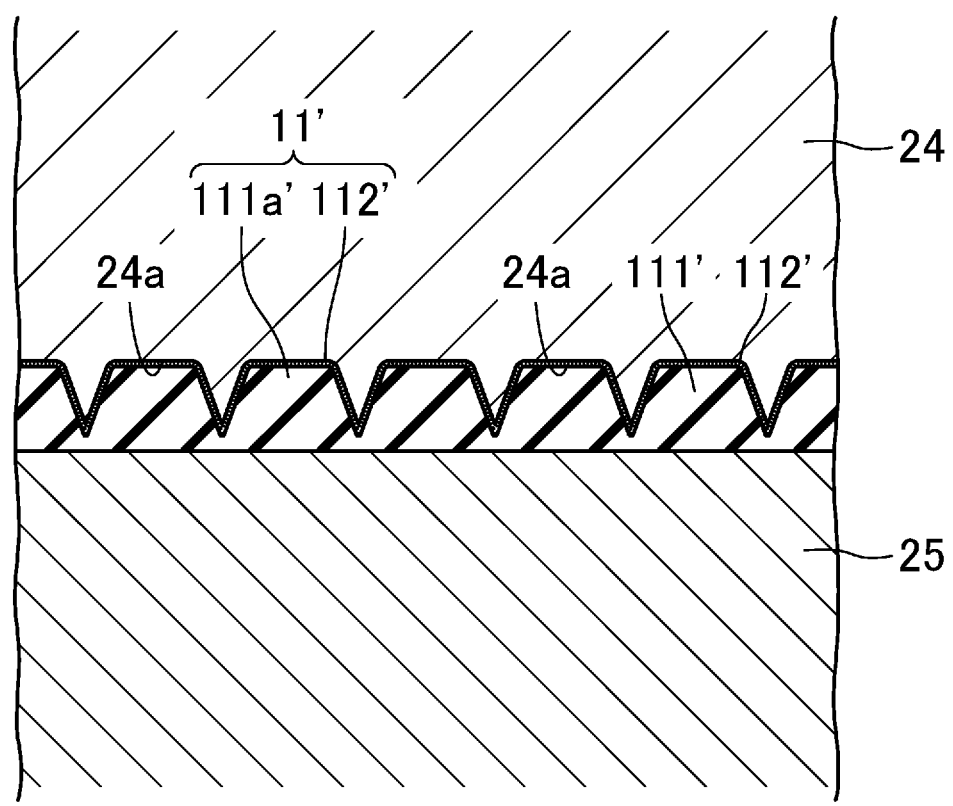
FIG. 14B is a second drawing showing how to affix the fabric material to the core rubber sheet in the component preparation step of the fifth production method.
Figure 14C:
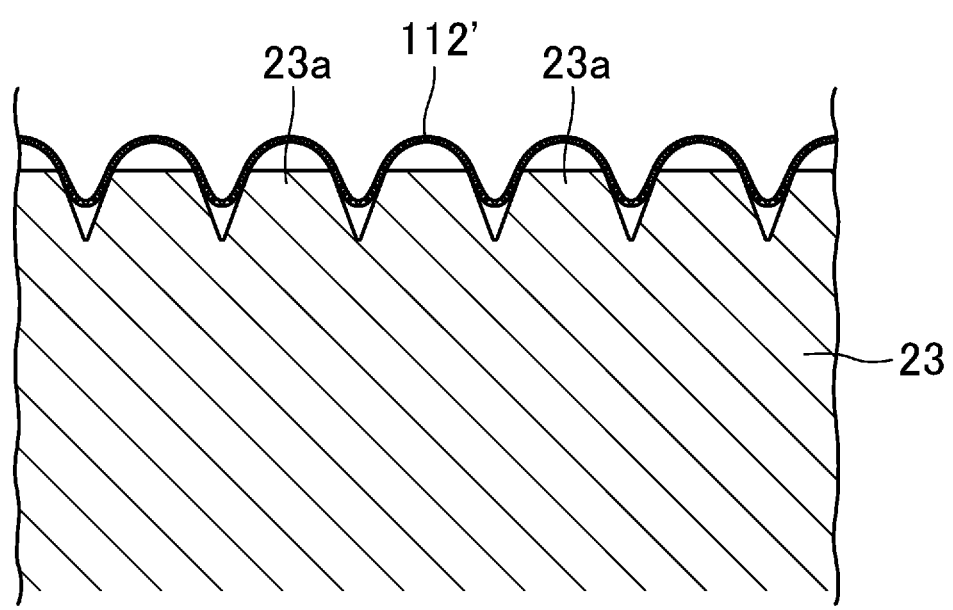
FIG. 14C is a third drawing showing how to affix the fabric material to the core rubber sheet in the component preparation step of the fifth production method.

A fifth production method will be described below with reference to FIGS. 14A to 14C.

The fifth production method includes a shaping step in which a core rubber sheet 111' is covered with a fabric material 112' in advance, and core rubber layer-forming portions 111a' covered with the fabric material 112' constitute compression layer-forming portions 11'. Covering the surface of the core rubber sheet 111' with the fabric material 112' in advance in this manner, prior to heating, and pressing toward the cylindrical mold 43, the shaped structure 36 or the uncrosslinked slab S' containing the shaped structure 36, can substantially prevent the fabric material 112' from being stretched locally and significantly. This can substantially prevent seepage of rubber which may occur through a portion stretched locally and significantly, and consequently reduce an abnormal noise which may be generated during running of the belt. The fabric material 112' may be closely fitted to the core rubber sheet 111' (the core rubber layer-forming portions 111a') like a single sheet, or may simply lie along the surface of the core rubber sheet 111' instead of being closely fitted.

The core rubber sheet 111' can be covered with the fabric material 112' in the following manner. That is, as shown in FIG. 14A, a fabric material-shaping roll 23 having trapezoidal ridges 23a (which have a shape corresponding to the shape of the core rubber layer-forming portions 111a', extend in the circumferential direction, and are arranged adjacent to each other in the axial direction of the roll 23) and a transfer roll 24 having trapezoidal grooves 24a (which have a shape corresponding to the shape of the compression layer-forming portions 11', extend in the circumferential direction, and are arranged adjacent to each other in the axial direction of the roll 24) are engaged with each other, with a space interposed therebetween. The fabric material 112' is passed between these two rolls so as to be shaped by the fabric material-shaping roll 23, and fitted to the surface of the transfer roll 24. Then, as shown in FIG. 14B, the core rubber sheet 111' is passed between the transfer roll 24 and a flat roll 25 such that the core rubber layer-forming portions 111a are fitted in the trapezoidal grooves 24a of the transfer roll 24, thereby affixing the fabric material 112' to a surface of the core rubber sheet 111'. In order to enhance the productivity, it is preferable to produce the core rubber sheet 111' covered with the fabric material 112' from an uncrosslinked rubber sheet 111" in a continuous manner, as follows: the uncrosslinked rubber sheet 111" is shaped into the core rubber sheet 111' using a core rubber-shaping roll 21 as shown in FIGS. 3A and 3B; the fabric material 112' is shaped along the transfer roll 24 using the fabric material-shaping roll 23 and the transfer roll 24 as shown in FIG. 14A; and the shaped fabric material 112' is affixed to the core rubber sheet 111' as shown in FIG. 14B.

Covering the surface of the core rubber sheet 111' (the core rubber layer-forming portions 111a') with the fabric material 112' in advance prior to heating, and pressing toward the cylindrical mold 43, the shaped structure 36 or the uncrosslinked slab S' including the shaped structure 36, and further shaping, prior to this covering process, the fabric material 112' to a shape that fits the surface of the core rubber layer-forming portions 111a', make it possible to reduce local stretch of the fabric material 112' to a small amount, enabling production of the V-belt B in which seepage of rubber through the covering fabric 112 is reduced. In order to reduce local stretch of the fabric material 112' to a small amount, the fabric material 112' is suitably subjected to a pleating process so that the cross section in the width direction is corrugated to have the same pitches as the core rubber layer-forming portions 111a' prior to sending the fabric material 112', not yet covering the surface of the core rubber sheet 111' (the core rubber layer-forming portions 111a'), to the fabric material-shaping roll 23, similarly to the first production method. As illustrated in FIG. 14C, the fabric material 112' is suitably positioned such that a portion of the fabric material 112' which protrudes toward the core rubber sheet 111' (the core rubber layer-forming portions 111a') is located at, and halfway fitted in, the groove between trapezoidal ridges 23a of the fabric material-shaping roll 23, that is, the groove between the core rubber layer-forming portions 111a' of the core rubber sheet 111', so that the fabric material 112' may loosely fit the core rubber sheet 111'.

The core rubber sheet 111' can be covered with the fabric material 112' by pressing.

In the first and third production methods, the resultant core rubber sheet 111' covered with the fabric material 112' may b wrapped around the adhesive rubber sheet 12' to prepare an uncrosslinked slab S'. In the second and fourth production methods, the resultant core rubber sheet 111' covered with the fabric material 112' may be used for producing the shaped structure 36 covered with the fabric material 112'.

The other features and advantages are the same as those of the first, second, third, or fourth production method.

(Sixth Production Method)

A sixth production method will be described below with reference to FIGS. 15A and 15B and FIGS. 16A and 16B.

According to the sixth production method, similarly to the steps of the first production method shown in FIGS. 4A to 4D, the reinforcing fabric 14', the adhesive rubber sheet 12', the cord 13', and another adhesive rubber sheet 12' are stacked on the shaping mandrel 31 in the stated order in the shaping step. After that, the entire circumferential surface of the stacked structure is pressed with a roller 32 on the adhesive rubber sheet 12' to integrate the stacked structure and form the tensile member 38, around which the core rubber sheet 111' is wrapped.

Figure 15A:
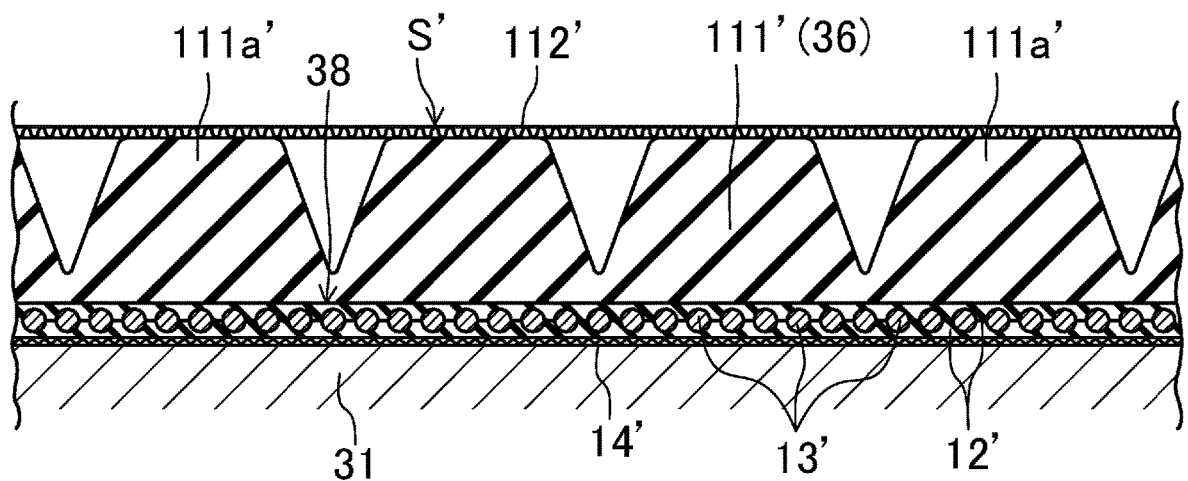
FIG. 15A shows a shaping step of a sixth production method.
Figure 15B:
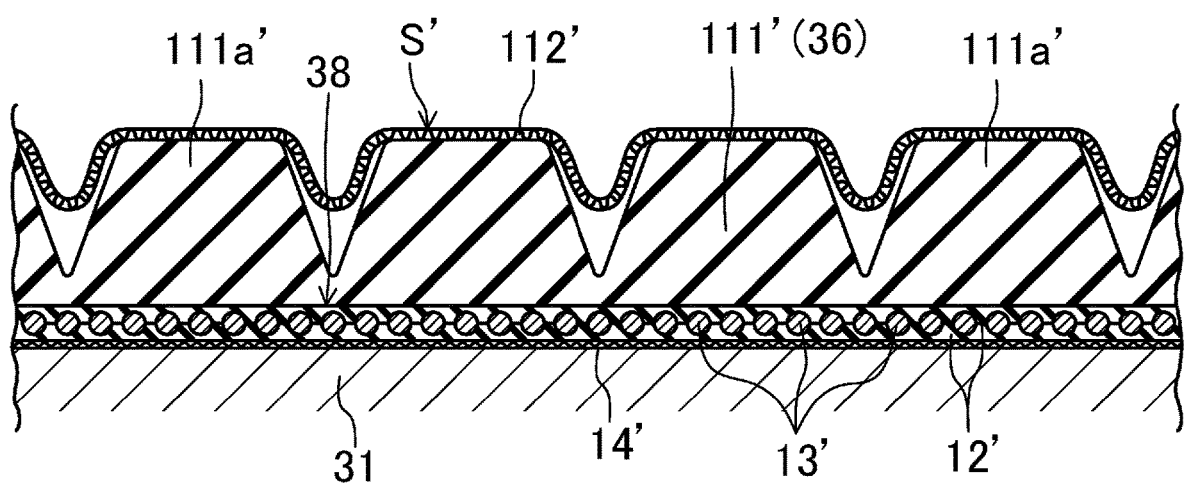
FIG. 15B shows a shaping step of a variation of the sixth production method.

Then, as shown in FIG. 15A, the fabric material 112' is wrapped around the core rubber sheet 111'. At this moment, the fabric material 112' is wrapped to have a cylindrical shape, while being supported on the tops of the core rubber layer-forming portions 111a' of the core rubber sheet 111', and layered on the core rubber sheet 111'. Ends of the fabric material 112' are butt jointed, lap jointed, or jointed, on an underlying layer, with a space between the ends. In order to reduce local stretch of the fabric material 112' to a small amount, as shown in FIG. 15B, a portion of the fabric material 112' which corresponds to a groove between the core rubber layer-forming portions 111a' of the core rubber sheet 111' may be halfway fitted in the groove between the core rubber layer-forming portions 111a' of the core rubber sheet 111'. For the same purpose, similarly to the step of the first production method shown in FIG. 4F, the fabric material 112' may be subjected to a pleating process so that the cross section in the width direction is corrugated to have the same pitches as the core rubber layer-forming portions 111a'. The fabric material 112' may be positioned such that a portion of the fabric material 112' which protrudes toward the core rubber sheet 111' is halfway fitted in a groove between the core rubber layer-forming portions 111a of the core rubber sheet 111', so that the fabric material 112' may loosely fit the core rubber sheet 111'. Alternatively, a fabric material 112' having a predetermined length may be formed into a cylindrical shape with its both ends joined together, and this cylindrically-shaped fabric material 112' may be fitted over the core rubber sheet 111'. In this case, the cylindrically-shaped fabric material 112' is fitted over the core rubber sheet 111' on the shaping mandrel 31. Alternatively, the cylindrically-shaped fabric material 112' may be fitted over the core rubber sheet 111' after the cylindrical structure including the core rubber sheet 111' is removed from the shaping mandrel 31.

In the manner described above, an uncrosslinked slab S' having a cylindrical shape is formed on the shaping mandrel 31. Thus, the uncrosslinked slab S' includes the reinforcing fabric 14', the adhesive rubber sheet 12', the cord 13', the other adhesive rubber sheet 12', the adhesive rubber sheet 111', and the fabric material 112' that are sequentially stacked toward the outside. The uncrosslinked slab S' includes the core rubber sheet 111' formed into a cylindrical shape, i.e., the shaped structure 36 which has a cylindrical shape. The shaped structure 36 is made of the uncrosslinked rubber composition and has, on its outer peripheral surface, the core rubber layer-forming portions 111a' which are the plurality of ridges extending in the circumferential direction and are arranged adjacent to each other in the axial direction.

Figure 16A:
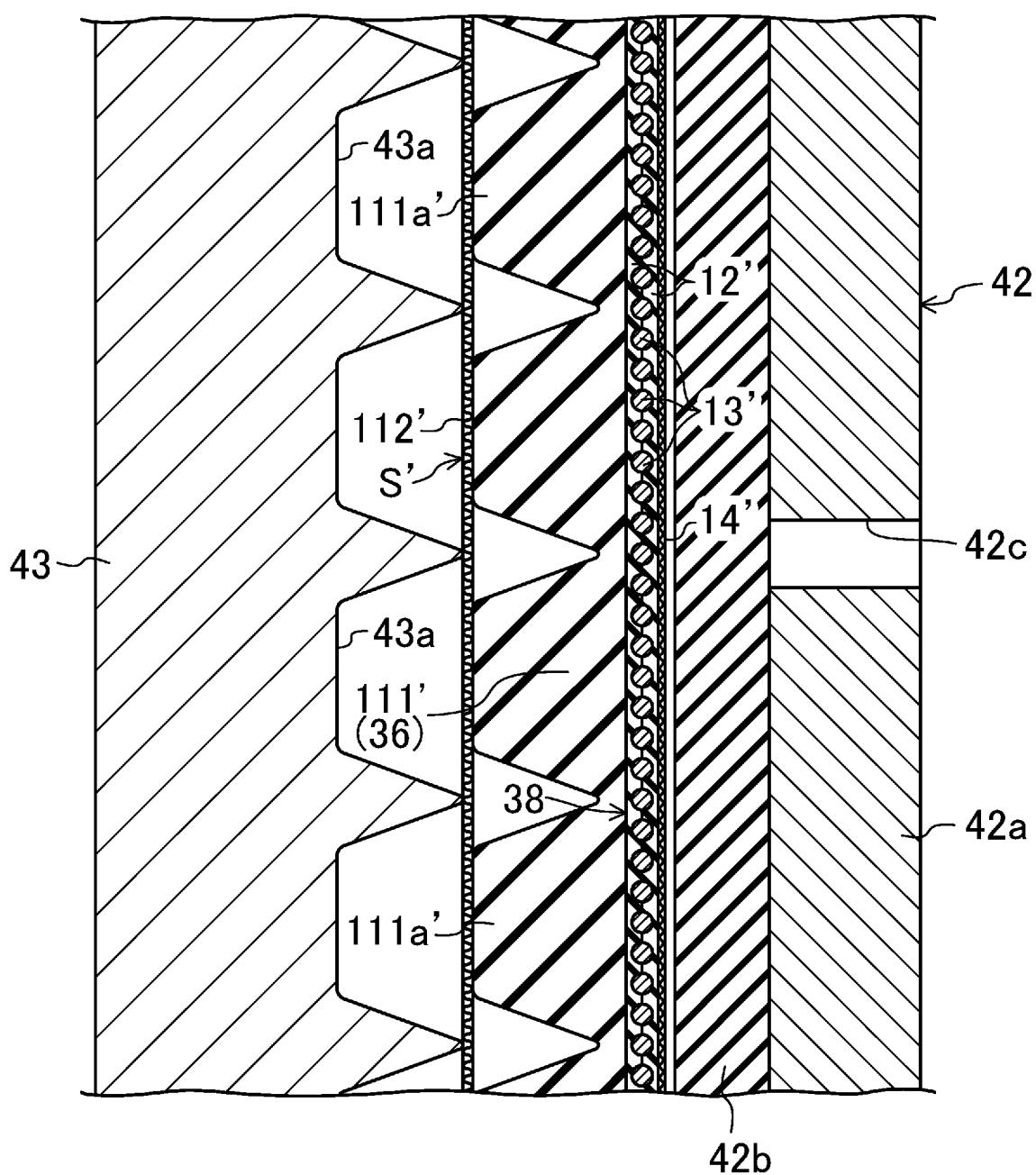
FIG. 16A is a first drawing showing a crosslinking step of the sixth production method.

As shown in FIG. 16A, in the crosslinking step, the uncrosslinked slab S' is removed from the shaping mandrel 31, and then, placed in the cylindrical mold 43 of the crosslinking apparatus 40, which has been previously detached from the base 41. More specifically, the uncrosslinked slab S' is set inside the cylindrical mold 43 such that the outer peripheral surface of the fabric material 112' comes into contact with the cylindrical mold 43 at locations apart from each other, and that each of the plurality of core rubber layer-forming portions 111a' of the core rubber sheet 111' is positioned at the opening of an associated one of the compression layer-shape grooves 43a of the cylindrical mold 43. The shaped structure 36 and the fabric material 112' are set inside the cylindrical mold 43 such that the shaped structure 36 is positioned inside, and the fabric material 112' is positioned outside, with respect to each other. The core rubber layer-forming portions 111a' may push the fabric material 112' such that a portion of each core rubber layer-forming portion 111a' enters the associated one of the compression layer-shape grooves 43a. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the tensile member 38 and the expansion sleeve 42b, and the shaped structure 36 and the tensile member 38 are in contact with each other. The cylindrical mold 43 is chosen to correspond to the length of the V-belt B to be produced. Note that short fibers, resin powder, or the like may be attached to the inner peripheral surface of the cylindrical mold 43 and/or the outer peripheral surface of the uncrosslinked slab S' in advance.

Figure 16B:
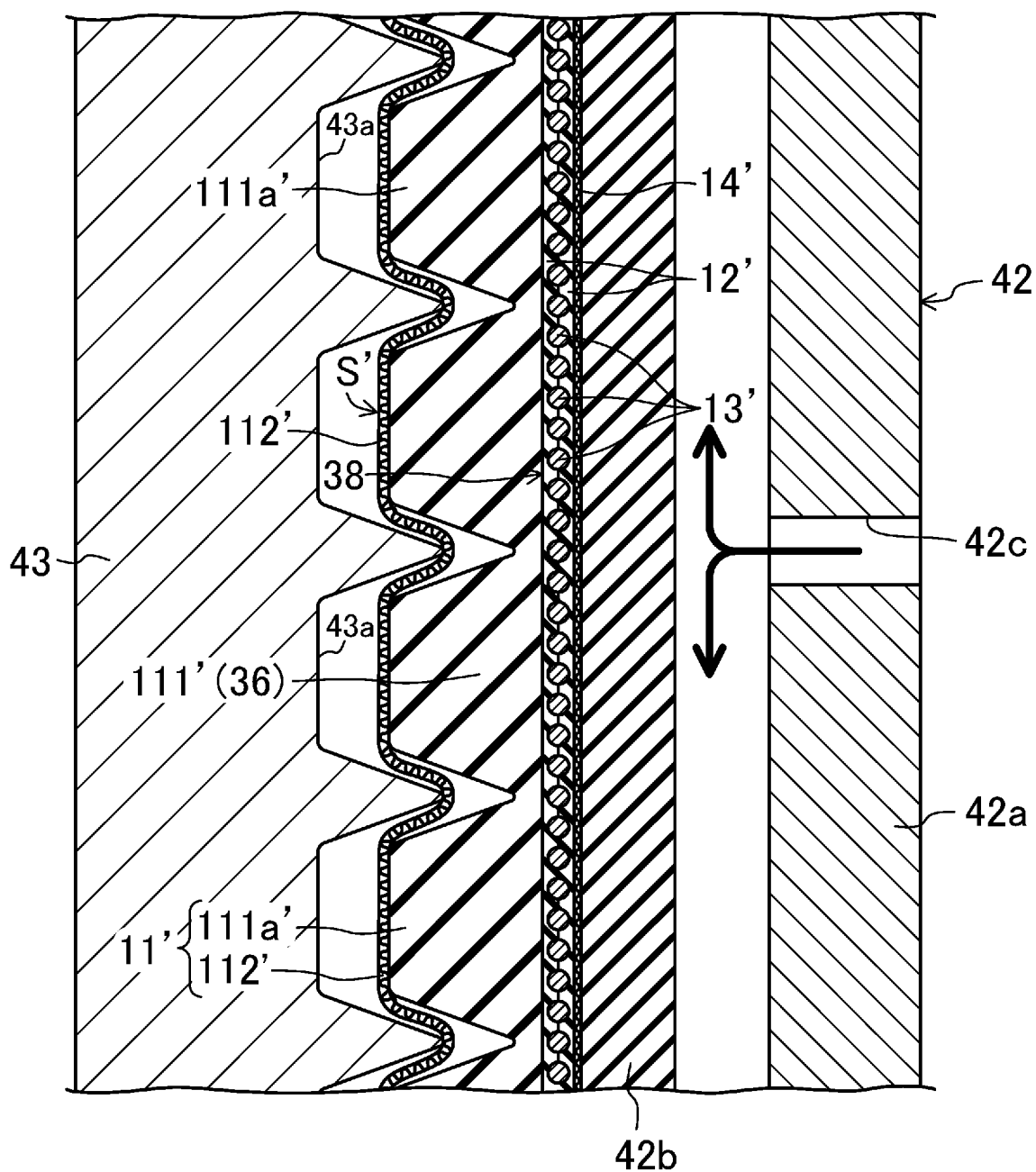
FIG. 16B is a second drawing showing the crosslinking step of the sixth production method.

The temperature of the cylindrical mold 43 is increased by the heating means, and the pressurizing means introduces high-pressure air into the drum body 42a of the expansion drum 42 so as to expand the expansion sleeve 42b radially outward. This state is maintained for a predetermined period of time. At this moment, as shown in FIG. 16B, the uncrosslinked slab S' is pressed against the cylindrical mold 43 by the expansion sleeve 42b which is expanded and comes into contact with the uncrosslinked slab S'. That is, the pressing of the shaped structure 36 toward the cylindrical mold 43 is carried out by expanding the expansion sleeve 42b, located radially inward of the shaped structure 36, and pushing the shaped structure 36 from radially inside. The core rubber sheet 111' pushes and stretches the fabric material 112', and is covered with the fabric material 112'. Further, each of the plurality of core rubber layer-forming portions 111a' of the core rubber sheet 111' enters an associated one of the compression layer-shape grooves 43a of the cylindrical mold 43, while pushing and stretching the fabric material 112'. The core rubber layer-forming portion 111a' and the fabric material 112' thus covering the core rubber layer-forming portions 111a' together form the compression layer-forming portion 11' in the associated one of the compression layer-shape grooves 43a. That is, the same state as in FIG. 6B illustrating the first production method is achievable at this stage. The uncrosslinked slab S' is heated by the cylindrical mold 43, while each of the compression layer-forming portions 11' (each of the core rubber layer-forming portions 111a' covered with the fabric material 112') is fitted in the associated one of the compression layer-shape grooves 43a of the cylindrical mold 43. The rubber components of the core rubber sheet 111' and the adhesive rubber sheets 12' that are included in the uncrosslinked slab S' are crosslinked and integrated with one another. As a result, a continuous structure of belt bodies 10 for a plurality of V-belts B, each including the core rubber layer 111 and the adhesive rubber layer 12, is produced. At the same time, the rubber components adhere to, and are combined with, the fabric material 112', the cord 13', and the reinforcing fabric 14'. A cylindrical belt slab S is thus formed eventually.

The other features and advantages are the same as those of the first production method.

The sixth production method may be applied to the third production method. In such a case, using a crosslinking apparatus 40 which is similar to that of the third production method and includes an expansion drum 42 that is attachable to, and detachable from, a base 41, the expansion drum 42 may serve also as a shaping mandrel 31 to produce the V-belt B of the embodiment.

(Seventh Production Method)

A seventh production method will be described below with reference to FIG. 17.

According to the seventh production method, a core rubber sheet 111' having a predetermined length may be formed into a cylindrical shape with its both ends joined together such that the core rubber layer-forming portions 111a' face outside. A shaped structure 36 which has a cylindrical shape is produced in this manner. The shaped structure 36 is made of the uncrosslinked rubber composition and has, on its outer peripheral surface, a plurality of core rubber layer-forming portions 111a' extending in the circumferential direction and arranged adjacent to each other in the axial direction. The core rubber sheet 111' is cut with an ultrasound cutter or the like, and its ends are butt jointed. To increase the joint strength, the butt joint is suitably achieved by abutting surfaces, of the core rubber sheet 111', which are oblique with respect to the thickness direction of the core rubber sheet 111'.

Next, a fabric material 112' is wrapped around the shaped structure 36. At this moment, the fabric material 112' is wrapped to have a cylindrical shape, while being supported on the tops of the core rubber layer-forming portions 111a' of the shaped structure 36, and layered on the shaped structure 36. Ends of the fabric material 112' are butt jointed, lap jointed, or jointed, on an underlying layer, with a space between the ends. Alternatively, a fabric material 112' having a predetermined length may be formed into a cylindrical shape with its both ends joined together, and this cylindrically-shaped fabric material 112' may be fitted over the shaped structure 36.

Further, similarly to the steps of the first production method shown in FIGS. 4A to 4C, the reinforcing fabric 14', the adhesive rubber sheet 12', the cord 13', and another adhesive rubber sheet 12' are stacked on the shaping mandrel 31 in the stated order. After that, the entire circumferential surface of the stacked structure is pressed with a roller 32 on the adhesive rubber sheet 12' to integrate the stacked structure and produce a cylindrical tensile member 38.

Figure 17:
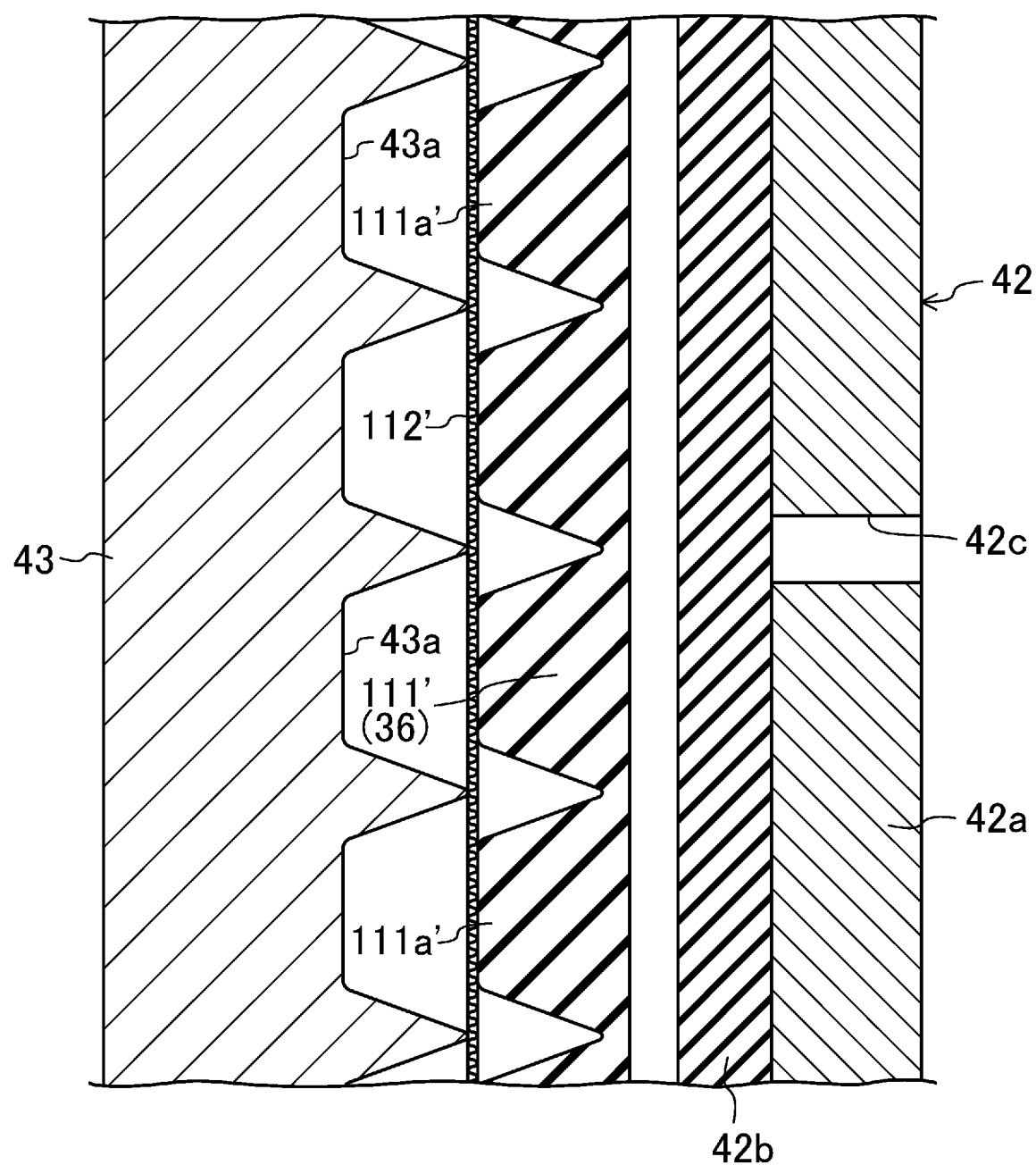
FIG. 17 shows a crosslinking step of a seventh production method.

As shown in FIG. 17, in a crosslinking step, the shaped structure 36 covered with the fabric material 112' is placed in the cylindrical mold 43 which has been removed from the base 41 of the crosslinking apparatus 40. More specifically, the shaped structure 36 covered with the fabric material 112' is set in the cylindrical mold 43 such that the outer peripheral surface of the fabric material 112' comes into contact with the cylindrical mold 43 at locations apart from each other in the circumferential direction, and that each of the plurality of core rubber layer-forming portions 111a' of the shaped structure 36 is positioned at the opening of an associated one of the compression layer-shape grooves 43a of the cylindrical mold 43. At this moment, the shaped structure 36 and the fabric material 112' are set inside the cylindrical mold 43 such that the shaped structure 36 is positioned inside, and the fabric material 112' is positioned outside, with respect to each other. The core rubber layer-forming portions 111a' may push the fabric material 112' such that a portion of each core rubber layer-forming portion 111a' enters the associated one of the compression layer-shape grooves 43a. The cylindrical mold 43 is chosen to correspond to the length of the V-belt B to be produced. Note that short fibers, resin powder, or the like may be attached to the inner peripheral surface of the cylindrical mold 43 and/or the outer peripheral surface of the fabric material 112' in advance.

The tensile member 38 is removed from the shaping mandrel 31, and is then fitted to the shaped structure 36 set in the cylindrical mold 43, such that the outer peripheral surface of the tensile member 38 comes into contact with the inner peripheral surface of the shaped structure 36, that is, so as to be in a positional relationship as in FIG. 16A illustrating the sixth production method. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the tensile member 38 and the expansion sleeve 42b, and the shaped structure 36 and the tensile member 38 are in contact with each other.

The other features and advantages are the same as those of the sixth production method.

The seventh production method may be applied to the fourth production method. In such a case, using a crosslinking apparatus 40 which is similar to that of the fourth production method and includes an expansion drum 42 that is attachable to, and detachable from, a base 41, the expansion drum 42 may serve also as a shaping mandrel 31 to produce the V-belt B of the embodiment.

Figure 18A:
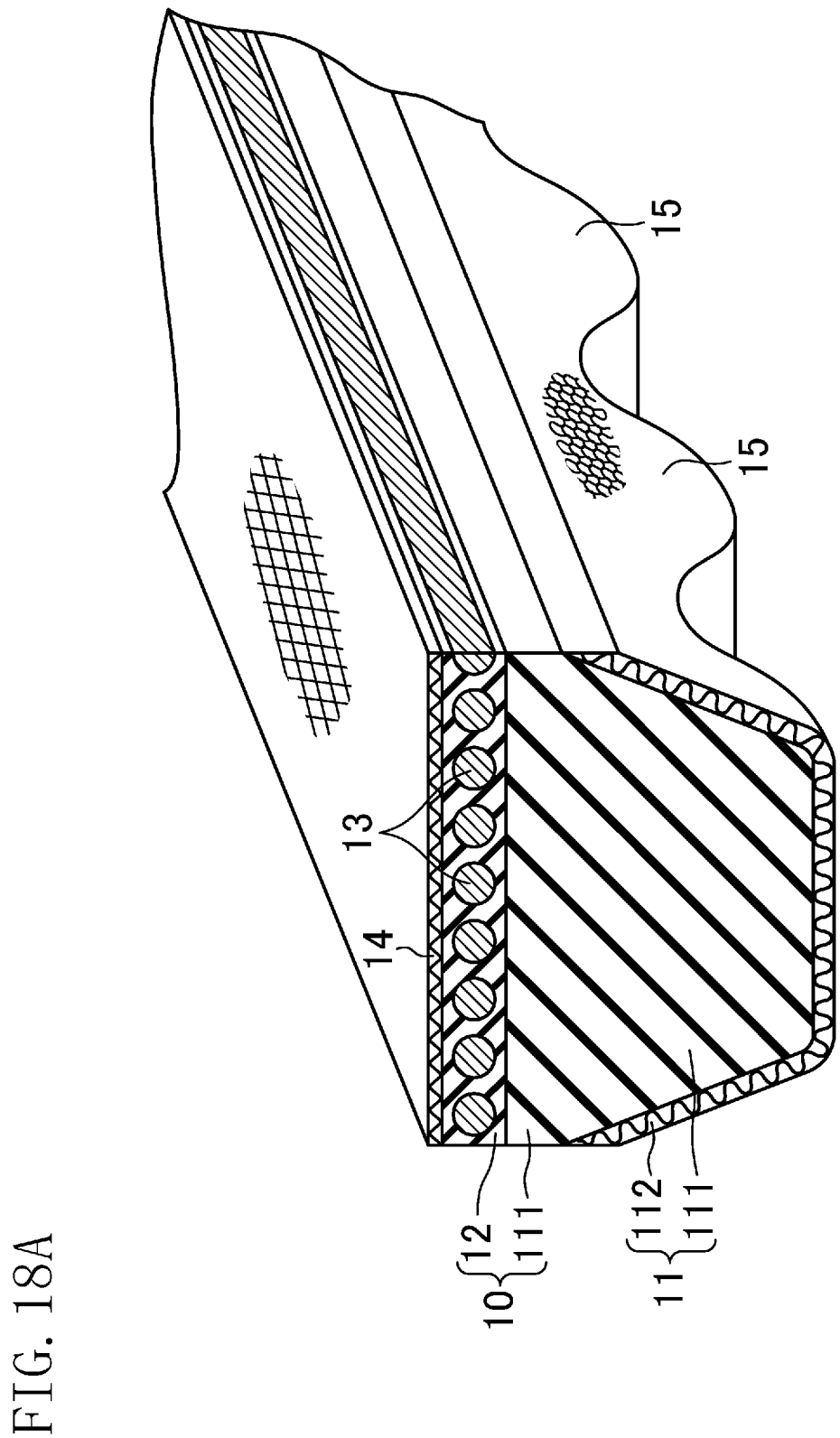
FIG. 18A is a perspective view of a single cogged V-belt produced according to another embodiment.
Figure 18B:
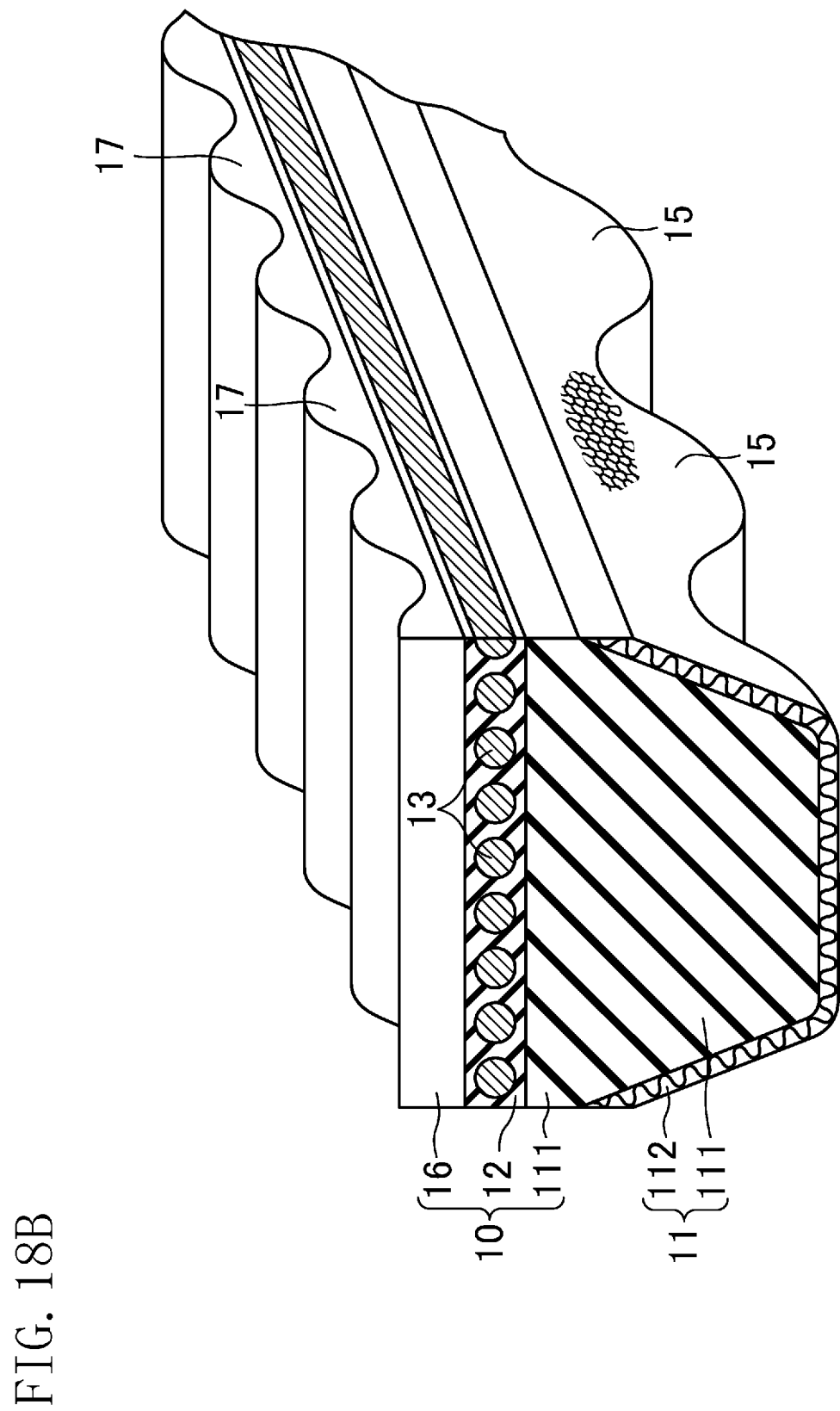
FIG. 18B is a perspective view of a double cogged V-belt produced according to another embodiment.
Figure 19A:
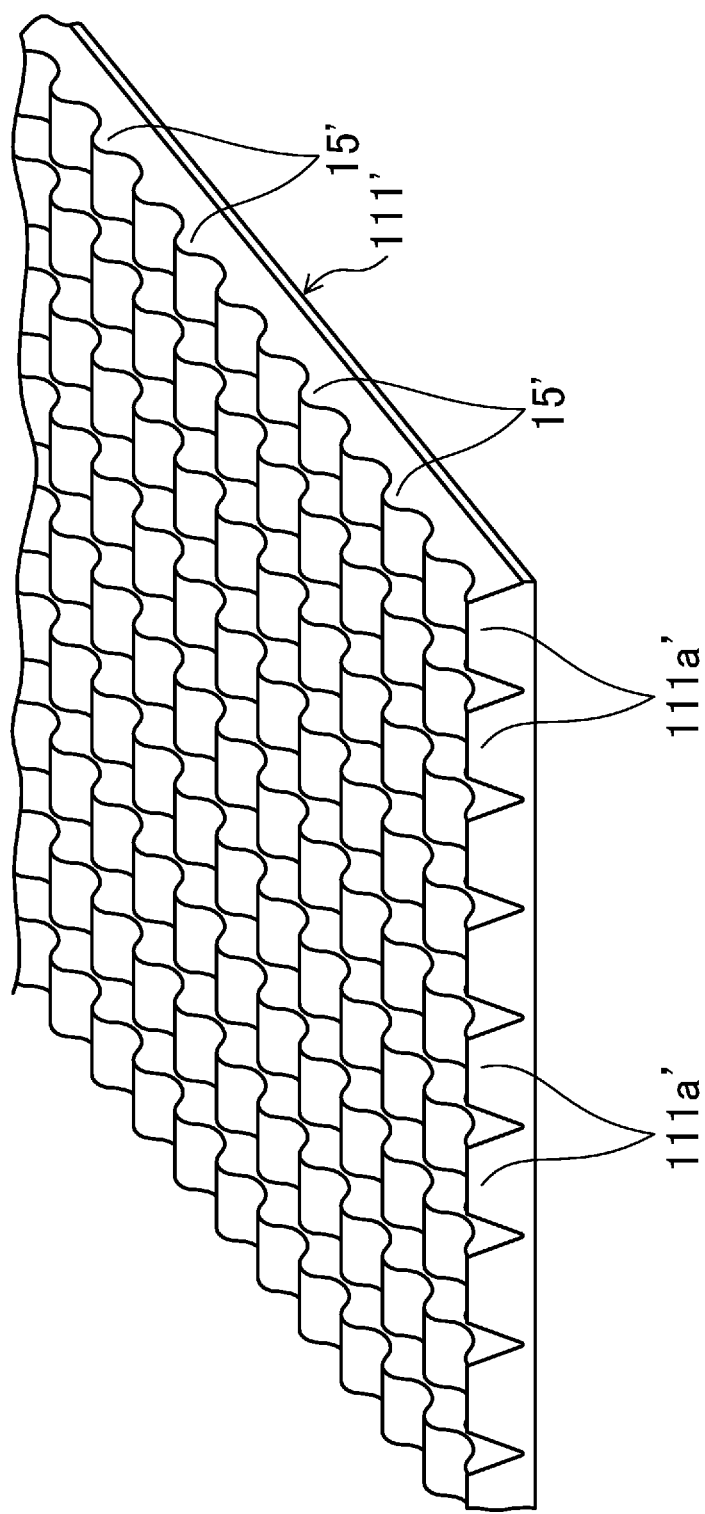
FIG. 19A is a perspective view of a core rubber sheet for use in another embodiment.
Figure 19B:
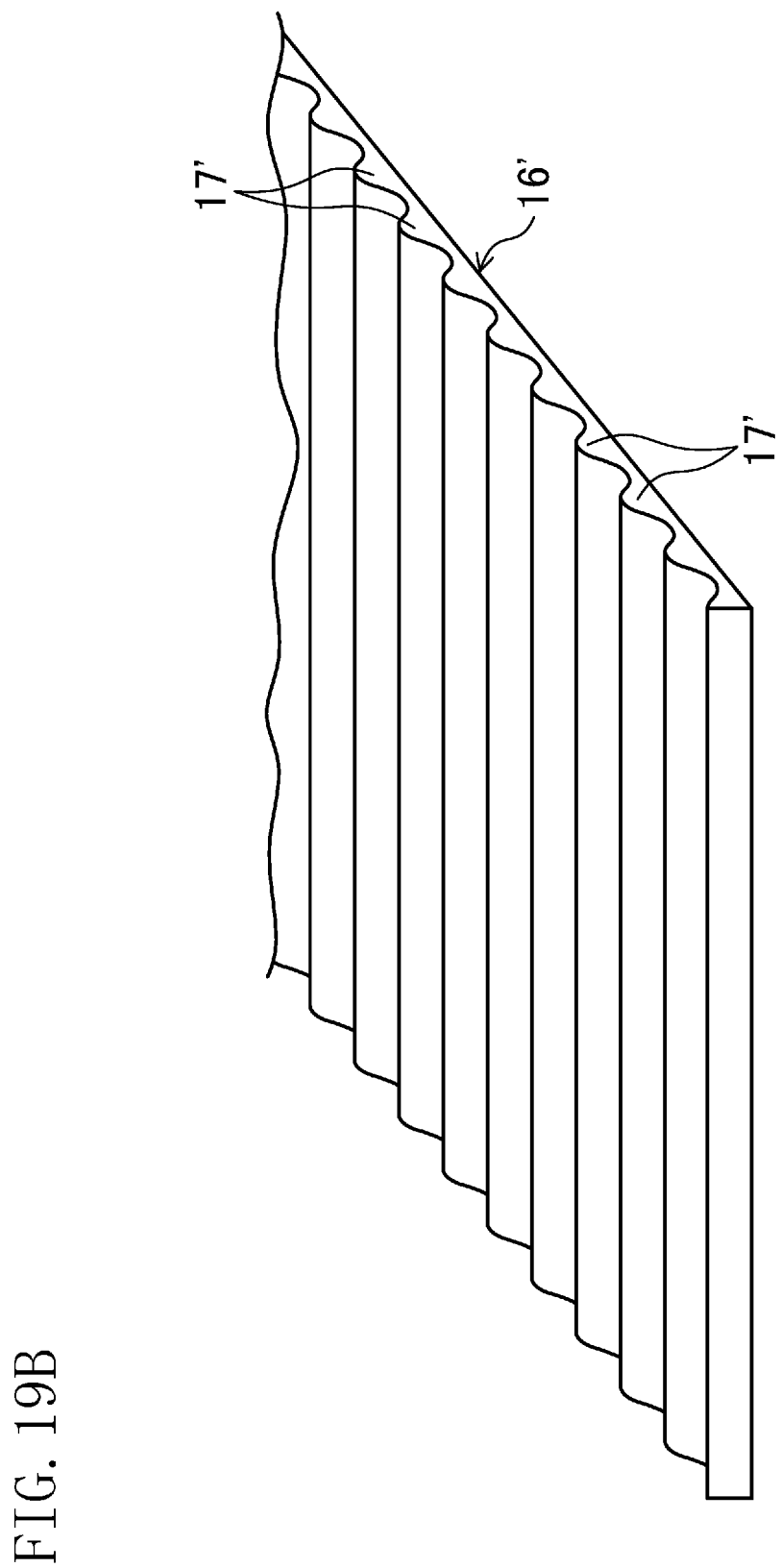
FIG. 19B is a perspective view of a stretch rubber sheet for use in another embodiment.

In the above embodiment, the V-belts B having configurations shown in FIG. 1 have been described as non-limiting examples. For example, the embodiment is also applicable to production of a single cogged V-belt B including a compression layer 11 having lower cogs 15 as shown in FIG. 18A, and a double cogged V-belt B including a compression layer 11 having lower cogs 15 and a stretch rubber layer 16 having upper cogs 17 as shown in FIG. 18B. In the case of producing the V-belt B including the compression layer 11 having the lower cogs 15, it is suitable to use a core rubber sheet 11' having lower cog-forming portions 15' as shown in FIG. 19A. In the case of producing the V-belt B including the stretch rubber layer 16 having the upper cogs 17, it is suitable to use a stretch rubber sheet 16' having upper cog-forming portions 17' as shown in FIG. 19B. The core rubber sheet 111' having the lower cog-forming portions 15' and the stretch rubber sheet 16' having the upper cog-forming portions 17' can be prepared by a method similar to the fifth production method.

In the embodiment described above, the uncrosslinked slab S' is crosslinked by using the cylindrical mold 43. However, the embodiment is not particularly limited to this configuration. For example, the uncrosslinked slab may be suspended between two shafts, and a portion of the uncrosslinked slab may be press molded between a flat-shaped mold and a plate-shaped belt mold having a plurality of compressed rubber layer-shape grooves which are arranged adjacent to each other in the groove width direction. The uncrosslinked slab may be crosslinked while being passed in the circumferential direction.

The embodiment has been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A production method of a V-belt having a compression layer which forms an inner peripheral side, in a thickness direction, of the V-belt, and which has, on both sides thereof, friction transmission surfaces covered with a covering fabric, the method comprising:
   a step of forming a shaped structure having a cylindrical shape, made of an uncrosslinked rubber, and having, on its outer peripheral surface, a plurality of ridges extending in a circumferential direction and arranged adjacent to one another in an axial direction;
   a step of forming compression layer-forming portions after forming the ridges, each of the compression layer-forming portions to be the compression layer, by covering the formed ridges with a fabric material which is to be the covering fabric;
   a step of molding a cylindrical belt slab, using a belt mold having a plurality of compression layer-shape grooves arranged adjacent to one another in a groove width direction, by heating and pressing, toward the belt mold, and thereby crosslinking the shaped structure, formed in the step of forming the shaped structure, and integrating the shaped structure and the fabric material, while having each of the compression layer-forming portions, which are formed in the step of forming the compression layer-forming portions, fitted in an associated one of the compression layer-shape grooves of the belt mold; and
   a step of cutting the belt slab, molded in the step of molding the belt slab, into ring-shaped pieces such that one ring-shaped piece corresponds to one compression layer-forming portion.

2. The production method of claim 1, wherein
   the belt mold has a cylindrical shape having, on an inner peripheral surface thereof, the plurality of compression layer-shape grooves each extending in the circumferential direction and arranged adjacent to one another in the axial direction, and
   the shaped structure and the fabric material are placed inside the belt mold.

3. The production method of claim 1, wherein
   prior to the heating the shaped structure and pressing the shaped structure toward the belt mold, the ridges are covered with the fabric material so as to form the compression layer-forming portions.

4. The production method of claim 3, wherein
   before the ridges are covered with the fabric material, the fabric material is shaped to have a corrugated cross section having same pitches as pitches of the ridges, and then, disposed such that portions of the fabric material which protrude toward the ridges are positioned at grooves between the ridges.

5. The production method of claim 3, wherein
   before the ridges are covered with the fabric material, the fabric material is shaped so as to be fitted to surfaces of the ridges.

6. The production method of claim 1, wherein
   prior to the heating the shaped structure and pressing the shaped structure toward the belt mold, each of the compression layer-forming portions is fitted in an associated one of the compression layer-shape grooves.

7. The production method of claim 2, wherein
the pressing of the shaped structure toward the belt mold is carried out by expanding an expansion sleeve located radially inward of the shaped structure and pressing the shaped structure from radially inside by the expansion sleeve.

8. The production method of claim 7, wherein
a tensile member is provided between the shaped structure and the expansion sleeve, the tensile member being comprised of an uncrosslinked rubber composition having a cylindrical shape in which a cord is embedded so as to form a helical pattern having pitches in the axial direction, the uncrosslinked rubber composition of the tensile member is different from the uncrosslinked rubber composition of the shaped structure.

9. The production method of claim 8, wherein
the tensile member is provided on the expansion sleeve prior to the expansion of the expansion sleeve.

10. The production method of claim 8, wherein
a space is formed between the tensile member and the expansion sleeve prior to the expansion of the expansion sleeve.

11. The production method of claim 9, wherein
the shaped structure and the tensile member are brought into contact with each other prior to the expansion of the expansion sleeve.

12. The production method of claim 9, wherein
a space is formed between the shaped structure and the tensile member prior to the expansion of the expansion sleeve.

13. The production method of claim 2, wherein
the fabric material is in contact with an inside of the belt mold prior to the pressing of the shaped structure toward the belt mold.

14. The production method of claim 13, wherein
the fabric material is in contact with the inside of the belt mold at locations apart from each other in an axial direction of the belt mold.

15. The production method of claim 1, wherein
in the step of forming the shaped structure, the shaped structure is formed from a rubber sheet made of the uncrosslinked rubber composition having a plurality of ridges extending parallel to one another and arranged adjacent to one another.

16. A production method of a V-belt having a compression layer which forms an inner peripheral side, in a thickness direction, of the V-belt, and which has, on both sides thereof, friction transmission surfaces covered with a covering fabric, the method comprising:
a step of forming a rubber sheet made of an uncrosslinked rubber composition having a plurality of ridges extending parallel to one another and arranged adjacent to one another;
a step of forming compression layer-forming portions, each of the compression layer-forming portions to be the compression layer, by covering the plurality of ridges of the rubber sheet, formed in the step of forming the rubber sheet, with a fabric material which is to be the covering fabric;
a step of forming a cylindrical object from an object formed to have the compression layer-forming portions in the step of forming the compression layer-forming portions by covering the plurality of ridges of the rubber sheet with the fabric material, the cylindrical object having the compression layer-forming portions on its outer peripheral surface, the compression layer-forming portions extending in a circumferential direction and arranged adjacent to one another in an axial direction;
a step of molding a cylindrical belt slab, using a belt mold having a plurality of compression layer-shape grooves arranged adjacent to one another in a groove width direction, by heating and pressing, toward the belt mold, the cylindrical object formed in the step of forming the cylindrical object, and thereby crosslinking the uncrosslinked rubber composition and integrating the uncrosslinked rubber composition and the fabric material, while having each of the compression layer-forming portions fitted in an associated one of the compression layer-shape grooves of the belt mold; and
a step of cutting the belt slab, molded in the step of molding the belt slab, into ring-shaped pieces such that one ring-shaped piece corresponds to one compression layer-forming portion.

17. The production method of claim 16, wherein
the belt mold has a cylindrical shape having, on an inner peripheral surface thereof, the plurality of compression layer-shape grooves each extending in the circumferential direction and arranged adjacent to one another in the axial direction, and
the cylindrical object is placed inside the belt mold.

18. The production method of claim 17, wherein
the cylindrical object is in contact with an inside of the belt mold prior to the pressing of the cylindrical object toward the belt mold.

19. A production method of a V-belt having a compression layer which forms an inner peripheral side, in a thickness direction, of the V-belt, and which has, on both sides thereof, friction transmission surfaces covered with a covering fabric, the method comprising:
using a belt mold having a plurality of compression layer-shape grooves arranged adjacent to one another in a groove width direction;
heating and pressing, toward the belt mold, and thereby crosslinking a shaped structure that has a cylindrical shape and integrating the shaped structure and a fabric material to form a cylindrical belt slab, the shaped structure being made of an uncrosslinked rubber composition and having, on an outer peripheral surface thereof, a plurality of ridges each extending in a circumferential direction and arranged adjacent to one another in an axial direction, while having each of compression layer-forming portions, which are to be the compression layer, fitted in an associated one of the compression layer-shape grooves of the belt mold, each of the compression layer-forming portions being comprised of an associated one of the plurality of ridges of the shaped structure which is covered with the fabric material to be the covering fabric;
cutting the belt slab into ring-shaped pieces such that one ring-shaped piece corresponds to one compression layer-forming portion; and
prior to the heating the shaped structure and pressing the shaped structure toward the belt mold, the ridges are covered with the fabric material so as to form the compression layer-forming portions, and before the ridges are covered with the fabric material, the fabric material is shaped so as to be fitted to surfaces of the ridges.

20. A production method of a V-belt having a compression layer which forms an inner peripheral side, in a thickness direction, of the V-belt, and which has, on both sides thereof, friction transmission surfaces covered with a covering fabric, the method comprising:

using a belt mold having a cylindrical shape having, on an inner peripheral surface thereof, a plurality of compression layer-shape grooves each extending in a circumferential direction and arranged adjacent to one another in an axial direction;

placing, inside the belt mold, a shaped structure having a cylindrical shape and a fabric material to be the covering fabric, the shaped structure being made of an uncrosslinked rubber composition and having, on an outer peripheral surface thereof, a plurality of ridges extending in the circumferential direction and arranged adjacent to one another in the axial direction;

molding a cylindrical belt slab by heating and pressing, toward the belt mold, and thereby crosslinking the shaped structure and integrating the shaped structure and the fabric material, while having each of compression layer-forming portions, which are to be the compression layer, fitted in an associated one of the compression layer-shape grooves of the belt mold, each of the compression layer-forming portions being comprised of an associated one of the plurality of ridges of the shaped structure which is covered with the fabric material;

cutting the belt slab into ring-shaped pieces such that one ring-shaped piece corresponds to one compression layer-forming portion;

carrying out the pressing of the shaped structure toward the belt mold by expanding an expansion sleeve located radially inward of the shaped structure and pressing the shaped structure from radially inside by the expansion sleeve;

providing a tensile member between the shaped structure and the expansion sleeve, the tensile member being comprised of an uncrosslinked rubber composition having a cylindrical shape in which a cord is embedded so as to form a helical pattern having pitches in the axial direction; and forming a space between the tensile member and the expansion sleeve prior to the expansion of the expansion sleeve.

21. A production method of a V-belt having a compression layer which forms an inner peripheral side, in a thickness direction, of the V-belt, and which has, on both sides thereof, friction transmission surfaces covered with a covering fabric, the method comprising:

using a belt mold having a cylindrical shape having, on an inner peripheral surface thereof, a plurality of compression layer-shape grooves each extending in a circumferential direction and arranged adjacent to one another in an axial direction;

placing, inside the belt mold, a shaped structure having a cylindrical shape and a fabric material to be the covering fabric, the shaped structure being made of an uncrosslinked rubber composition and having, on an outer peripheral surface thereof, a plurality of ridges extending in the circumferential direction and arranged adjacent to one another in the axial direction;

molding a cylindrical belt slab by heating and pressing, toward the belt mold, and thereby crosslinking the shaped structure and integrating the shaped structure and the fabric material, while having each of compression layer-forming portions, which are to be the compression layer, fitted in an associated one of the compression layer-shape grooves of the belt mold, each of the compression layer-forming portions being comprised of an associated one of the plurality of ridges of the shaped structure which is covered with the fabric material;

cutting the belt slab into ring-shaped pieces such that one ring-shaped piece corresponds to one compression layer-forming portion;

the pressing of the shaped structure toward the belt mold is carried out by expanding an expansion sleeve located radially inward of the shaped structure and pressing the shaped structure from radially inside by the expansion sleeve;

providing a tensile member between the shaped structure and the expansion sleeve, the tensile member being comprised of an uncrosslinked rubber composition having a cylindrical shape in which a cord is embedded so as to form a helical pattern having pitches in the axial direction; and prior to the expansion of the expansion sleeve, providing the tensile member on the expansion sleeve and bringing the shaped structure and the tensile member into contact with each other.

\* \* \* \* \*